(12) United States Patent
Sribhibhadh et al.

(10) Patent No.: US 8,392,225 B2
(45) Date of Patent: Mar. 5, 2013

(54) FOOD TRACING AND TRACKING SYSTEM AND METHOD

(75) Inventors: Paul Sribhibhadh, Bangkok (TH); James M. Thomson, Bangkok (TH); Joseph Rajkumar, Choa Chu Kang (SG); Chatta Udomwongsa, Bangkok (TH); Gregory R. Clarke, Kailua Kona, HI (US); Stephen E. Johnson, San Francisco, CA (US); Michael Blaha, Chesterfield, MO (US)

(73) Assignee: FXA Group, Bangkok (TH)

( * ) Notice: Subject to any disclaimer, the term of this patent is extended or adjusted under 35 U.S.C. 154(b) by 1285 days.

(21) Appl. No.: 10/421,630

(22) Filed: Apr. 22, 2003

(65) Prior Publication Data

US 2003/0236768 A1    Dec. 25, 2003

Related U.S. Application Data

(60) Provisional application No. 60/375,202, filed on Apr. 22, 2002, provisional application No. 60/375,192, filed on Apr. 22, 2002.

(51) Int. Cl.
G06Q 10/00        (2012.01)
(52) U.S. Cl. ........................................ 705/7.11; 705/1.1
(58) Field of Classification Search ................ 705/7.11, 705/1.1
See application file for complete search history.

(56) References Cited

U.S. PATENT DOCUMENTS

| | | | | |
|---|---|---|---|---|
| 5,478,990 | A * | 12/1995 | Montanari et al. | 235/375 |
| 6,377,296 | B1 * | 4/2002 | Zlatsin et al. | 348/143 |
| 6,664,897 | B2 * | 12/2003 | Pape et al. | 340/573.3 |
| 7,027,975 | B1 * | 4/2006 | Pazandak et al. | 704/9 |
| 7,062,262 | B2 * | 6/2006 | Baird | 455/419 |
| 7,412,461 | B2 * | 8/2008 | Sholl et al. | 1/1 |
| 2002/0032497 | A1 * | 3/2002 | Jorgenson et al. | 700/115 |
| 2002/0049643 | A1 * | 4/2002 | Church | 705/26 |
| 2002/0134456 | A1 * | 9/2002 | Soehnlen et al. | 141/9 |
| 2002/0158765 | A1 | 10/2002 | Pape et al. | |
| 2002/0199170 | A1 * | 12/2002 | Jameson | 717/120 |
| 2005/0261991 | A1 * | 11/2005 | Kennamer | 705/28 |

FOREIGN PATENT DOCUMENTS

FR    2813683 A1    3/2002
WO    W00148651 A1    7/2001

OTHER PUBLICATIONS

McKean, "The importance of traceability for public health and consumer protection", Epiz, 2001, 20(2), 363-371.*

(Continued)

*Primary Examiner* — Thomas L Mansfield, Jr.
(74) *Attorney, Agent, or Firm* — Foster Pepper PLLC; Richard T. Black; P. G. Scott Born

(57) ABSTRACT

A food tracing and tracking system, method, and computer-program product are provided. The present invention allows small, medium and large-size companies that operate within these supply-chains, to exchange information bi-directionally throughout the entire supply-chain while maintaining data integrity and appropriate levels of security at all times and allowing this in real-time. The present invention enables a continuous linkage across the supply-chain-entities and changing of supply-chain entities in near real-time. The present invention ensures data integrity and data security, performs language translation, maintains a continues history over time without the need for data conversion, and provides each entity within the supply chain the option of publishing their identity and data to the other supply chain entities. New fields can be added as needed for processes and materials. The present invention supports distributed data hosted on various machines by various organizations over a public or private data network.

16 Claims, 33 Drawing Sheets

OTHER PUBLICATIONS

Breton E etal, "Weaving definition and execution aspects of process meta-models," System Sciences, 2001. HICSS Proceedings of the 35th Annual Hawaii International Conferences on Jan. 7-10, 2001, Piscataway, NJ, USA, IEEE, Jan. 7, 2001, pp. 3808-3817.

Kleissner, C., "Enterprise Objects TM Framework. A Second Generation Objects-Relational Enabler." SIGMOD Record, ACM, NY, NY, US, vol. 24, No. 2, Jun. 1995, pp. 455-459.

Wilson TP et al., "Food safety and Traceability in the Agricultural Supply Chain: Using the Internet to Deliver Traceability." Supply Chain Management, MCB University Press, Bradford, GB, vol. 3, No. 3, 1998, pp. 127-133.

Pettit RG., "Traceability in the food animal industry and supermarket chains." Revue Scientifique ET Technique—Office International Des Pizooties/ Scientific and Technical Review—International Office of Epizootics, Office International Des Epizooties, Paris, FR, vol. 20, No. 2, Aug. 2001, pp. 584-597.

D.T. Pham, Deng, Ceng, Fiee, B.J. Peat, MSC, Ceng, Miee. Hybrid Method for Systems Analysis, IEE Proc.-Sci. Meas. Technol., vol. 142, No. 5, Sep. 1995. pp. 350-361 United Kingdom.

Fearne, A., The Evolution of Partnerships in the Meat Supply Chain: Insight from the British Beef Industry, Supply Chain Management, 1998, vol. 3, No. 4, p. 214, section 3.4.

Light E., Tracking and Tracing Down the Food Chain, NZ Business, May 2001, vol. 15, Issue 4, p. 44, entire article.

Pawar et al., Electronic Trading in the Supply Chain: A Holistic Implementation Framework, Logistics Information Management, Bradford, 2000; vol. 13, lss 1, p. 21, entire article.

PR Newswire, John Deere Partners with VantagePoint network and CropVerifeye.com, LLC to Introduce the New CropTracer (TM) System Feb. 26, 2001, entire article.

van Dorp, Kees-Jan, Tracking and Tracing: A structure for Development and Contemporary Practices, Logistics Information Management, 2002, vol. 15, No. 1, p. 24-33, entire article.

Wilson et al. Food Safety and Traceability in the Agricultural Supply Chain: Using the Internet to Deliver Traceability, Supply Chain Management, Bradford, 1998, vol. 3, Iss. 3, start p. 127, entire article.

\* cited by examiner

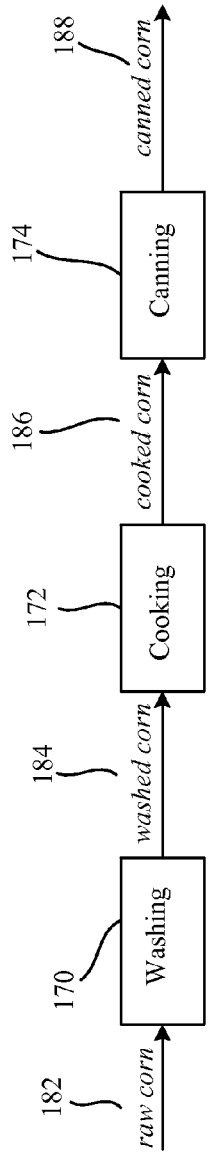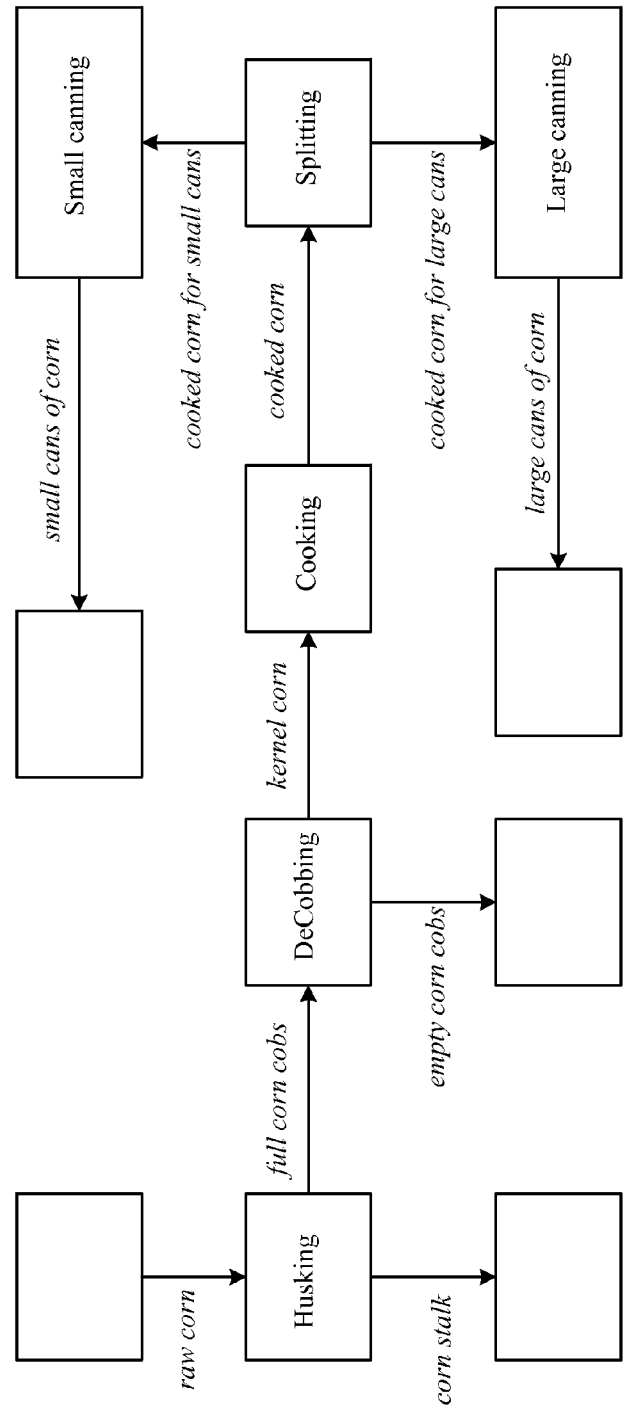

Oxytetracycline Residue Analysis Report

| | | | | |
|---|---|---|---|---|
| Sampling unit | 101 | Analyzed date | 05-Feb-2003 | * 19 |
| Test method | MICROBIOASSAY | | | |

Details

| | | | | |
|---|---|---|---|---|
| Reference no. | 1001022003 | Received date | 05-Feb-2003 | 19 |
| Tank (Truck) | TTR-1002 | Raw material date | 05-Feb-2003 | * 19 |
| Raw material time | 11:42 | Source | FARM | |
| Sample Type | BT CPND | Size | 4 | |
| Test result | Not detected ppb | | | |

Remarks [ ]

Audit log [ ]

Approval information

| | | | | |
|---|---|---|---|---|
| Quality Supervisor | | Approved date | | 19 |
| Unit manager | | Approved date | | 19 |

[ Save ] [ Preview ] [ Reset ] [ Cancel ]

Microbiological Analysis Report (Raw Material)

| | | | |
|---|---|---|---|
| Sampling unit | 103 | Analyzed date | 05-Jun-2003 * |

Details

| | | | |
|---|---|---|---|
| Reference no. | 1001062003 | Sampling date | 05-Jun-2003 |
| Sampling time | 11:47 | Order no. | F004 |
| Sample Type | BT CPND | Size | 4 |
| Tank (Truck) | TTR-1002 | Raw material date | 05-Jun-2003 * |

Microbiological Analysis Details

| Description | Results | Remarks |
|---|---|---|
| ☐ APC (cfu/g) 5.0 X 10 | Found | Re-heat 400c |

[Add] [Delete]

Audit log

Approval information

| | | | |
|---|---|---|---|
| Quality Supervisor | | Approved date | |
| Unit manager | | Approved date | |

[Save] [Preview] [Reset] [Cancel]

*Fig. 21*

Trace criteria

| | | | |
|---|---|---|---|
| Quality code | | Production code | |
| Tank no. | TTR-1002 | Raw Material Date | 5-Jun-2003 |

[Go] [Reset]

*Fig. 22*

| Pakfood Public Company Limited |||||
|---|---|---|---|---|
| Oxytetracycline Residue Analysis Report |||||
| Sampling unit | 103 | | Analyzed date | 05-Jun-2003 |
| Test method | MICROBIOASSAY | | | |
| Details |||||
| Reference no. | 1001062003 | | Received date | 05-Jun-2003 |
| Tank (Truck) | TTR-1002 | | Raw material date | 05-Jun-2003 |
| Raw material time | 11:42 | | Source | FARM |
| Sample Type | BT CPND | | Size | 4 |
| Test result | Not detected ppb | | | |
| Remarks |||||
| Audit log |||||
| Approval information |||||
| Quality Supervisor | | | Approved date | |
| Unit manager | | | Approved date | |

*Fig. 24*

| Pakfood Public Company Limited |||||
|---|---|---|---|---|
| Chloramphenical Residue Analysis Report |||||
| Sampling unit | 103 | | Analyzed date | 05-Jun-2003 |
| Test method | ELISA | | | |
| Details |||||
| Reference no. | 1001062003 | | Received date | 05-Jun-2003 |
| Tank (Truck) | TTR-1002 | | Raw material date | 05-Jun-2003 |
| Raw material time | 11:44 | | Source | FARM |
| Sample Type | BT CPND | | Size | 4 |
| Test result | Not detected ppb | | | |
| Remarks |||||
| Audit log |||||
| Approval information |||||
| Quality Supervisor | | | Approved date | |
| Unit manager | | | Approved date | |

*Fig. 25*

| Pakfood Public Company Limited | | | |
|---|---|---|---|
| Microbiological Analysis Report (Raw Material) | | | |
| Sampling unit | 103 | Analyzed date | 05-Jun-2003 |

Details

| | | | |
|---|---|---|---|
| Reference no. | 1001062003 | Sampling date | 05-Jun-2003 |
| Sampling time | 11:47 | Order no. | T004 |
| Sample Type | BT CPND | Size | 5 |
| Tank (Truck) | TTR-1002 | Raw material date | 05-Jun-2003 |

Microbiological Analysis Details

| Description | Results | Results |
|---|---|---|
| APC (cfu/g) 5.0 X 10 | Pass | Test remarks |

Audit log

Approval information

| | |
|---|---|
| Quality Supervisor | Approved date |
| Unit manager | Approved date |

*Fig. 26*

Trace criteria

| | | | |
|---|---|---|---|
| Quality code | | Production code | |
| Tank no. | TTR-950 | Raw Material Date | 10-Mar-2003 |

[Go] [Reset]

*Fig. 27*

Pakfood Public Company Limited
Oxytetracycline Residue Analysis Report

| Sampling unit | 10 | Analyzed date | 10-Mar-2003 |
|---|---|---|---|
| Test method | MICROBIOASSAY | | |

Details

| Reference no. | 1001032003 | Received date | 10-Mar-2003 |
|---|---|---|---|
| Tank (Truck) | TTR-950 | Raw material date | 10-Mar-2003 |
| Raw material time | 11:42 | Source | FARM |
| Sample Type | BT CPND | Size | 4 |
| Test result | Not detected ppb | | |

Remarks

Audit log

Approval information

| Quality Supervisor | | Approved date | |
|---|---|---|---|
| Unit manager | | Approved date | |

*Fig. 29*

Pakfood Public Company Limited
Chloramphenical Residue Analysis Report

| Sampling unit | 10 | Analyzed date | 10-Mar-2003 |
|---|---|---|---|
| Test method | ELISA | | |

Details

| Reference no. | 1001032003 | Received date | 10-Mar-2003 |
|---|---|---|---|
| Tank (Truck) | TTR-950 | Raw material date | 10-Mar-2003 |
| Raw material time | 11:44 | Source | FARM |
| Sample Type | BT CPND | Size | 4 |
| Test result | Not detected ppb | | |

Remarks

Audit log

Approval information

| Quality Supervisor | | Approved date | |
|---|---|---|---|
| Unit manager | | Approved date | |

Dumper report165

Activity

Checked date: 19-Sep-2002  Machine Name: Dumper
Start time: 17:49  Stop time: 23:50

| Machine operation | | | | | | Reason for stopping the machine | | | |
|---|---|---|---|---|---|---|---|---|---|
| Farmer name | Field no. | Unloading start time | Unloading stop time | Vehicle register no. | Total (Min) | Reason | Stop time | Start time | Remarks |
| fxafarm1 ball | N2002X01 | 17:49 | 18:50 | 123456 | 61.00 | Out of Order | 17:53 | 17:58 | |
| fxafarm1 ball | N2002X01 | 19:51 | 20:51 | 5658 | 60.00 | | | | |

Approval information

Reported by _____ Date _____
Production Supervisor _____ Date _____
Quality Control Supervisor _____ Date _____
Control manager _____ Date _____
BP

*Fig. 37*

Rotary cooker cooler report232

Checked date: 19-Sep-2002
Inkcode date: 18-Sep-2002
Can size: 304 X 407

| Checked time | Initial Temperature (c) | Precook | | | | Cooker | | | | Cooler | | | | Gear cycle | | | Free residual chlorine | | |
|---|---|---|---|---|---|---|---|---|---|---|---|---|---|---|---|---|---|---|---|
| | | Checked time | Precook pressure | Precook MIG/Temp/TempIn (c) | Precook Recorder/Temp/Temp out (c) | Cooker pressure | Cooker MIG/Temp/TempIn (c) | Cooker Recorder/Temp/Temp out (c) | Cooler Pressure | Cooler MIG/Temp/TempIn (c) | Cooler Recorder/Temp/Temp out (c) | Checked time | Gear cycle (sec/cycle) | Can/Minute | Checked time | Before Cooling (ppm) | After Cooling (ppm) |
| 09:00 | 35.00 | 09:00 | 7.00 | 7.00 | 8.00 | 7.00 | 8.00 | 78.00 | 8.00 | 7.00 | 8.00 | 09:00 | 12.00 | 0.00 | | | |
| 09:30 | 15.00 | 09:45 | 7.00 | 8.00 | 9.00 | 6.00 | 5.00 | 4.00 | 5.00 | 6.00 | 7.00 | 10:20 | 12.00 | 210.00 | 09:00 | 25.00 | 25.00 |
| 10:00 | 25.00 | 10:30 | 7.00 | 8.00 | 9.00 | 7.00 | 6.00 | 5.00 | 4.00 | 5.00 | 5.00 | 11:00 | 25.00 | 210.00 | 11:00 | 12.00 | 12.00 |
| 11:00 | 25.00 | 11:30 | 7.00 | 8.00 | 9.00 | 6.00 | 7.00 | 8.00 | 9.00 | 7.00 | 8.00 | 12:00 | 20.00 | 100.80 | 11:30 | 12.00 | 12.00 |
| 11:30 | 20.00 | 12:00 | 7.00 | 8.00 | 6.00 | 5.00 | 4.00 | 32.00 | 7.00 | 7.00 | 9.00 | 12:30 | 23.00 | 126.00 | 12:30 | 12.00 | 12.00 |
| 12:00 | 23.00 | 12:30 | 7.00 | 8.00 | 6.00 | 5.00 | 4.00 | 3.00 | 7.00 | 8.00 | 9.00 | 13:00 | 23.00 | 109.57 | 13:00 | 23.00 | 23.00 |
| 12:30 | 20.00 | 13:00 | 7.00 | 6.00 | 5.00 | 4.00 | 3.00 | 4.00 | 6.00 | 7.00 | 8.00 | 13:30 | 20.00 | 109.57 | 13:30 | 25.00 | 25.00 |
| 13:00 | 25.00 | 13:30 | 7.00 | 8.00 | 6.00 | 5.00 | 4.00 | 3.00 | 5.00 | 6.00 | 7.00 | 14:00 | 25.00 | 126.00 | 14:00 | 25.00 | 25.00 |
| | | | | | | | | | | | | | | 100.80 | 14:30 | 25.00 | 25.00 |

*Fig. 38*

FOOD TRACING AND TRACKING SYSTEM AND METHOD

PRIORITY CLAIM

This application claims priority from Provisional Application Ser. Nos. 60/375,202 (Our Ref: FXAG.1.1002) and 60/375,192 (Our Ref: FXAG.1.1001) both of which were filed Apr. 22, 2002, and are hereby incorporated by reference.

FIELD OF THE INVENTION

This invention relates generally to supply chain tracing and tracking and, more specifically, to food tracing and tracking.

BACKGROUND OF THE INVENTION

The food industry has a relatively low technology penetration and companies vary widely in their ability to provide information to their partners in any given supply-chain. This inability to provide information is compounded by the complex nature of the supply-chains themselves. The supply chains consist of a complex maze of sequence and parallelisms that can be arbitrarily mixed and changed with time as shown in the FIG. 1.

Many companies (supply-stage legal entities) or a combination of supply-chain legal entities) require a complex structure that enables maintenance of the manufacturing processes across various departments, divisions or even different companies. Further, when companies are being asked to perform a trace of a product they fail to be able to provide answers to questions such as: what is in the container on the ship; how many pallets are inside the container; how many boxes are inside the pallets; how many cans are inside the box; what is inside the can; where did the content come from; how was it grown; what fertilizer was used; what pesticides were used; when was the seed sown; what type of seed was used; was the farm next to a power plant; did the farm have toilets; what manufacturing processes were used, etc.

Existing business enterprise software and logistics software vendors such as; SAP, Oracle, 12, People-Soft and Manugistics fail to be able to accommodate the fact that the food supply-chain will be in a constant state of flux. The supply-chain entities continually aim to optimize their resources, reduce their costs, and increase their efficiencies while still meeting all regulatory and commercial constraints. In practice, this means that the supply-chain entities constantly change their suppliers, their supply-chain processes and stages.

Because the supply-chain is an environment of constant flux, the existing systems cannot change during run-time without affecting the database structure and application code. This means that no application easily adaptable for defining a new process or changing on existing process at the same time. In other words, the present systems create new databases when the primary application structure is altered. In addition, the present systems fail to consider the time taken for a product to travel the supply chain (e.g., farm to table).

As shown in FIG. 2, traditional enterprise software vendor (ES) provide software such as Enterprise Resources Planning (ERP), Material Requirements Planning (MRP) or financial and accounting software. These types of software applications help companies manage resources within their own business environment (inside the box). These types of software are usually very expensive and thus not all participants within the supply chain can afford them. In the food industry very few of the manufactures/suppliers have ERP-type solutions outside the U.S.A. and EU markets. Traditional logistics software vendors provide software for warehouse management, purchasing and automated inventory replenishment solutions. These types of software applications are also expensive and very few companies within the food industry supply-chain can afford them. They are designed to link between companies that have installed traditional enterprise software. They do not solve the problems associated with food safety and traceability.

Because the supply-chain is an environment of constant flux, there exists a need to have a structure capable of being changed during run-time itself without affecting the database structure and application code. There is a need to be able to define a new process or change an existing process at the same time. In other words, the system does not create new databases when the primary application structure is altered. Also, there exists a need to take into account the time taken for a product to travel the supply chain from farm to table.

SUMMARY OF THE INVENTION

The present invention allows small, medium and large-size companies that operate within these supply-chains, to exchange information in near real-time and bi-directionally throughout the entire supply-chain while maintaining data integrity and appropriate levels of security at all times. The present invention performs this by providing a batch-oriented process having any number of stages connected in any mix of parallel or serial order, nested to any depth. The present invention can be implemented in any industry that requires business process set-up and changes, e.g., food, pharmaceuticals, precious stones, electronic components, etc.

Also, the present invention supports continuous processes that can be approximated by a batch process.

The present invention enables a continuous linkage across the supply-chain entities while allowing the configuration or reconfiguration of the supply-chain entities to be changed, as and when required, in real or near real-time. The present invention accomplishes the foregoing while being capable of optionally providing the following additional features: ensuring data integrity and data security, maintaining a continuous history over time without the need for data conversion, and providing each entity within the supply chain the option of publishing their identity and data to the other supply chain entities. New fields can be added as needed for processes and materials. The present invention supports distributed data hosted on various machines by various organizations over a public or private data network.

The present invention provides the ability to create any processes that are sequential or parallel, plus is able to change these dynamically (i.e., at run time). The present invention allows for manipulation at run time of a directed graph. The directed graph includes nodes that are connected by arcs from a source node to a target node. The nodes are supply chain stages and the arcs are material lots that enter and exit the supply chain stages. The present invention permits both the definition of a process and the instantiation of a process to be defined at run time. Furthermore, the present invention can readily customize the processing for the particular needs of a company. The present invention can track the evolution of a food process for a particular company.

The present invention provides a food traceability application with advances from conventional database modeling. The food traceability application includes a new paradigm of soft-coded value patterns that allows for a very flexible, extensible and robust means of handling the complex supply chain requirements.

The present invention enables all levels of enterprise from low, limited complexity and low technical capabilities to high complexity and high technical capabilities to participate in a wider, more complex food industry supply-chain. The present invention includes the following optional features:

Distributed
International
Scalable
Sequence and parallelism that can be arbitrarily mixed
Standardized processes The present invention allows modifications to supply chain link, processes, and procedures. The number and links in the supply-chain can be increased or decreased as required. The links can be configured in any configuration of sequential or parallelism. Changes can be made to supply chain routes, process, and procedures at any time, even while the information system is in continuous operation.

BRIEF DESCRIPTION OF THE DRAWINGS

The preferred and alternative embodiments of the present invention are described in detail below with reference to the following drawings.

FIGS. 5-11 are software model diagrams of components of the present invention;
FIGS. 16-38 are examples of user interfaces formed in accordance with the present invention.

DETAILED DESCRIPTION OF THE PREFERRED EMBODIMENT

Figure 1:
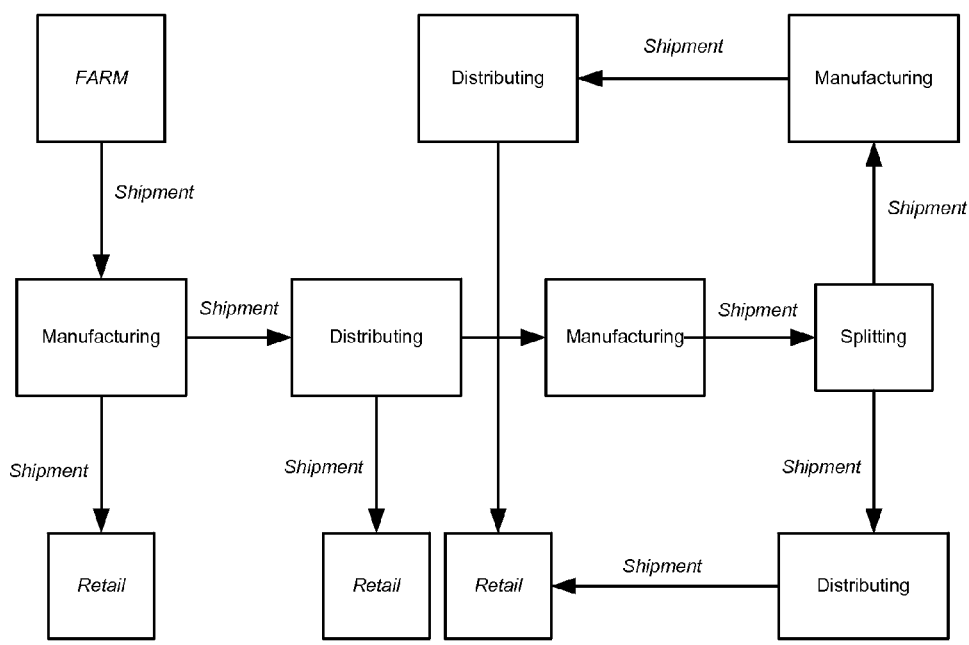
FIGS. 1 and 2 are illustrations of the prior art.
Figure 2:
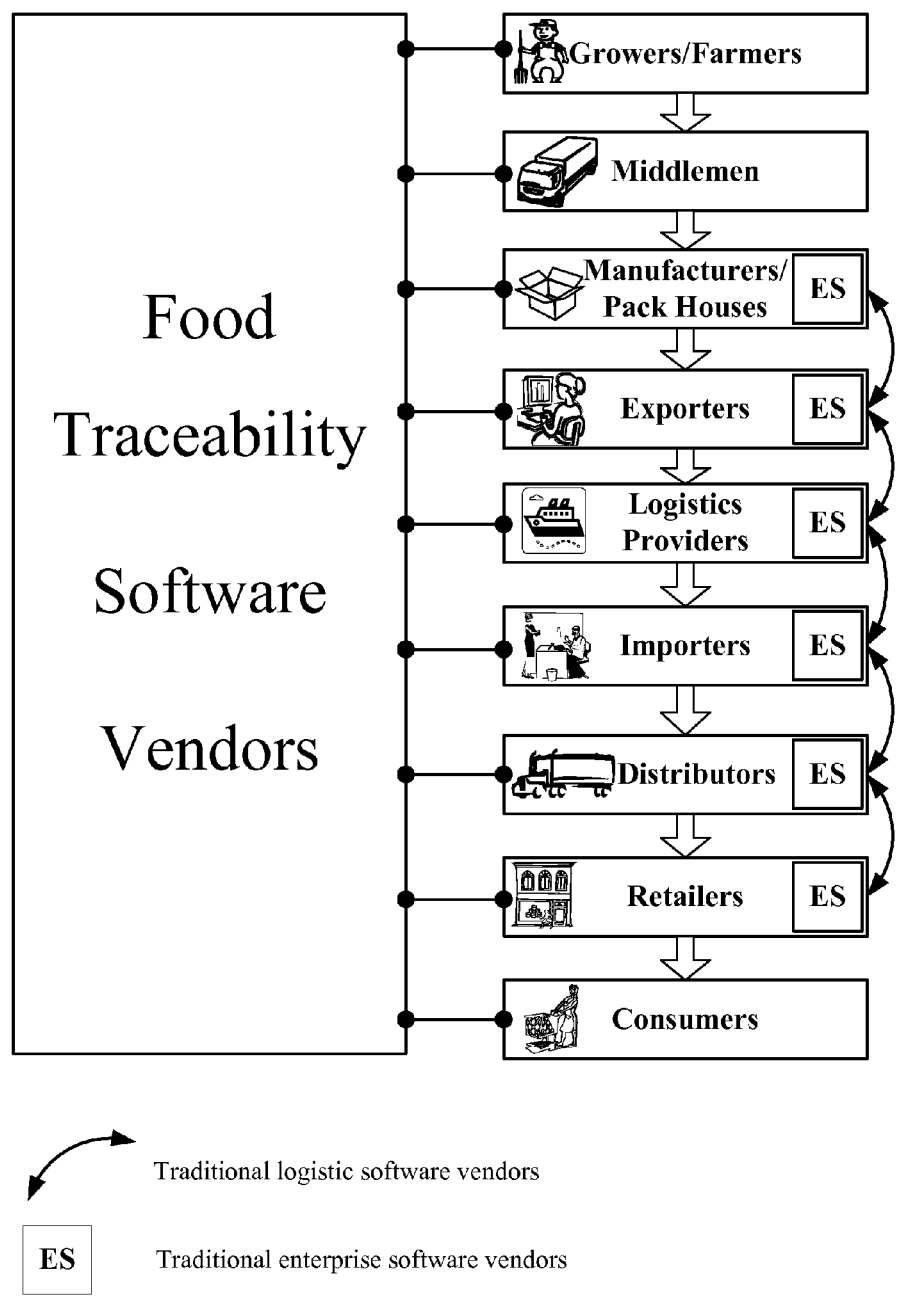
Figure 3A:
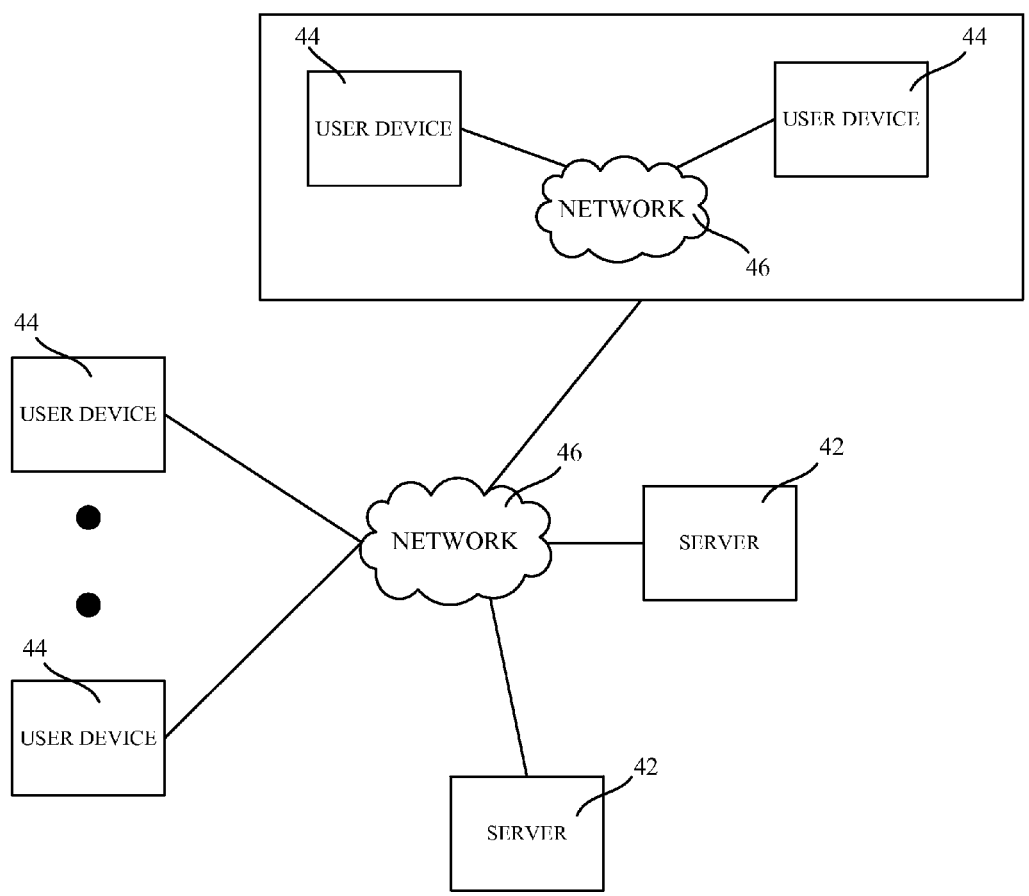
FIG. 3A is a system block diagram of the present invention.

The present invention is preferably implemented as a food traceability software application, but could be for any number of supply chains. The present invention includes a number of component software applications. FIG. 3A provides an overview example of a system 40 formed in accordance with the present invention. The present invention allows for a very flexible, extensible and robust means of handling the complex supply chain requirements.

As shown in FIG. 3A, the system 40 includes one or more servers 42 and user computer devices 44. Users in a supply chain, such as farmers, inspectors, producers, manufacturers, grocers, consumers, or restaurants, are linked through the over a network 46 (Internet or intra-net) to the food traceability application executed by a server 42. Examples of the user computer devices 44 are PDAs, wireless devices, browsers, existing legacy systems, or other computer-based devices.

The food traceability application provides traceability of food that meets regulatory and commercially driven industry objectives. All users in the food supply chain can access or input, at pre-determined level of details based on relevancy and appropriateness, critical data on the life-cycle of any product. Users external to the supply chain, such as regulatory agencies, can access relevant data with approval from parties involved.

The application allows modifications to supply-chain links, processes, and procedures to be easily reconfigured on-line instantly over a network connection. For example: the number of links within each supply-chain can be increased or decreased as the need arises. Also the processes within each link can also be configured on-line for any configuration of sequential or parallelism. Thus, changes can be made in the supply chain routes, processes, and procedures at any time even while the system 40 is in continuous operation.

Figure 3B:
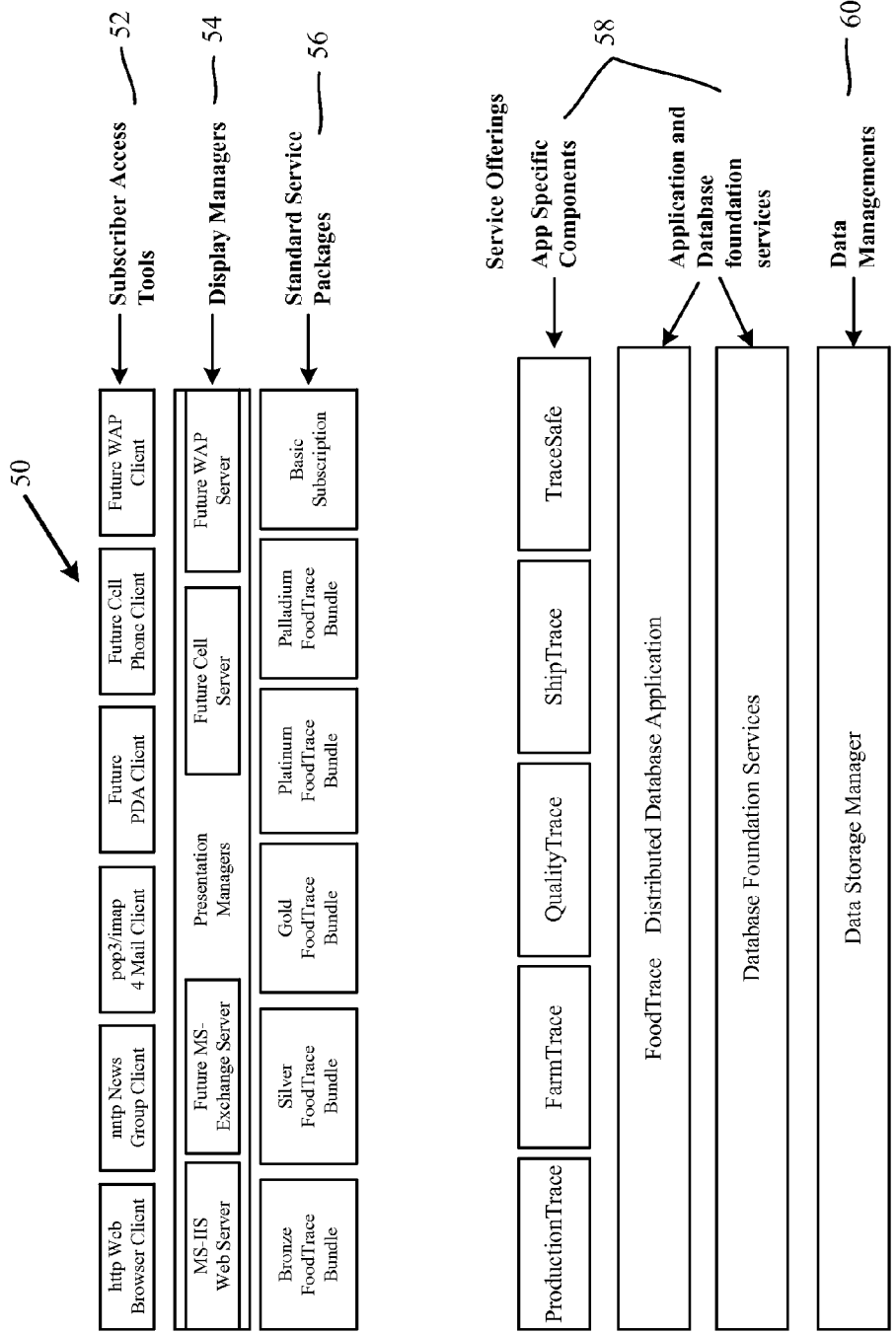
FIG. 3B is a diagram of the different software layers of the present invention.

FIG. 3B provides an example of a software architecture 50 of the present invention. The architecture 50 includes a Presentation Abstraction Layer 52 that insulates the user access devices such as desktop computers, PDAs, cellphones, etc, from changes in underlying presentation services. Thus, changes in servers do not affect the ability of users to retrieve services. The Presentation Abstraction Layer 52 provides filtering, formatting, encryption, and language conversion services for all the underlying presentation services.

A Presentation Services Layer 54 provides an interface between underlying applications and filtering, formatting, encryption, and language conversion services of the Presentation Abstraction Layer 52. Each presentation service receives display requests, converts those display requests into application requests, formats the query results, and passes those results to the Presentation Abstraction Layer 54 for post-processing.

An Application Services Layer 56 includes value-added offerings for which subscribers have paid. Each application offering exists on one or more servers. For example, the Application Services Layer 56 includes a food trace service offering.

Application services are built using foundation services 58. Those foundation services perform work common to all applications, but specific to none of those applications. Identifying system time, translating names to addresses, management directories of computers, users, applications and software objects, reporting alarm conditions, controlling component access and managing communication among system elements are all examples of foundation services shared among all applications.

A Data Abstraction Layer (DAL) 60 provides a degree of insulation between application and foundation services and the underlying data stores on which they draw. The DAL 60 converts all requests and replies into relational constructs. By shielding foundation and application services from the specifics of an underlying data store, new applications don't get tightly linked to specific structures, with all the problems that characterize ERP, MRP and other legacy applications.

The following example illustrates various benefits of the present invention. A manufacturer that is exporting produce (corn) from Thailand to a user in the UK.

Step 1. The manufacturer's inspectors use a farm component of the present invention to capture information for food traceability from their existing contract farmers.

Step 2. The manufacturer's QA department use a quality component to capture information for food traceability when the produce arrives at their manufacturing facility from the farm.

Step 3. The manufacturer's production personnel use a production component to capture the critical information required for food traceability/safety, and tie this information to the physical product (i.e., the bar code and batch number).

The present invention solution has now captured the information needed by regulatory and commercial users.

Step 4. The manufacturer uses a (distributed) database and communications infrastructure of the present invention to disseminate this information on request and by exception to the users that need this information.

Step 5. A user using the trace component with the manufacturer's permission to request information about food safety and traceability. The user does this by simply typing or scanning the barcode and batch number found on the product into the trace component to perform a trace. The user is now able to act in near real time on issues connected with food safety and traceability.

Step 6. Other users in the supply chain such a distributors, cold storage, logistical providers, etc. can be captured by using a shipping comonent.

The software of the present invention includes a Meta model that defines types, fields and complex structure and can be populated at runtime. Instead of hard coding fields as columns of specific tables, a Meta model (metadata structure) is provided for storing field definition and fields data. This is considered soft coding. Soft-coding allows users to efficiently manage evolution of the model as the scope expands. Application programming code is separated from the details of a particular usage, yielding highly flexible, customizable, and yet efficient software.

Brief Explanation of the Data Modeling Notation

Figure 4:
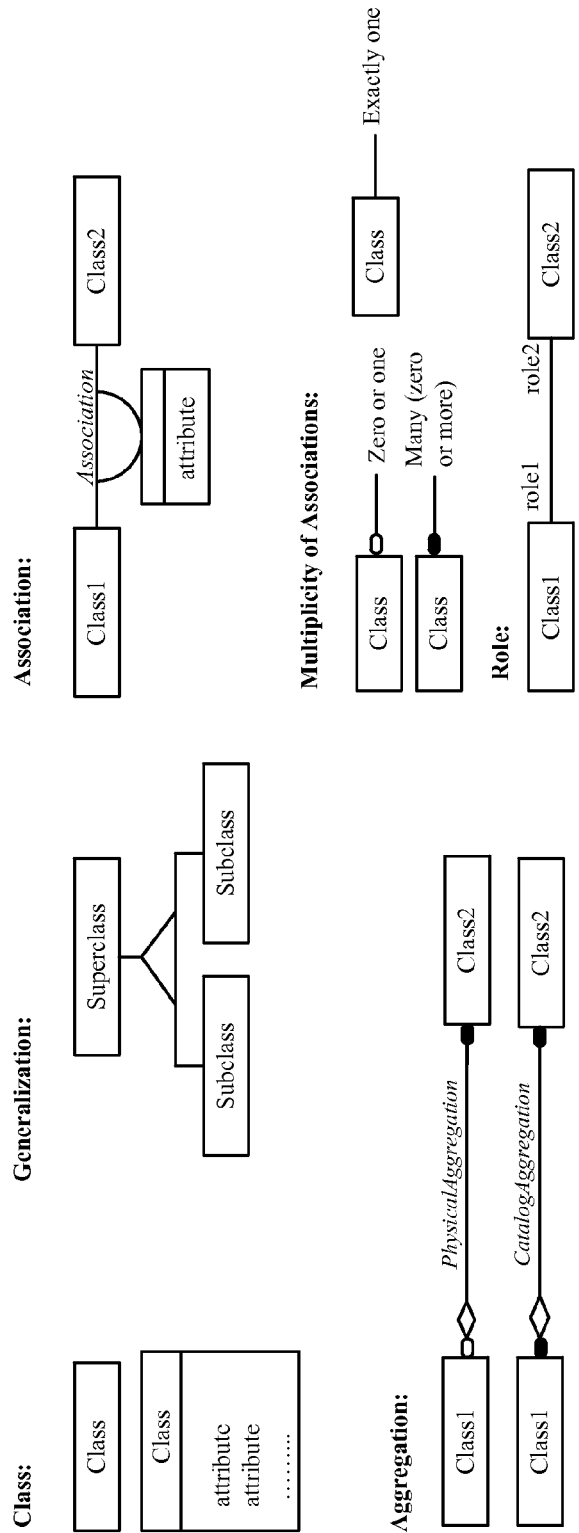
FIG. 4 is an explanation of notation used in describing the present invention.

FIGS. 5-16 illustrate a model of the present invention in OMT modeling notation that is a popular enhancement of the Entity-Relationship approach. FIG. 4 summarizes modeling constructs that are to describe the present invention. Object models are built from three basic constructs: classes, associations, and generalizations.

A class is denoted by a box and describes objects with common attributes, behavior, and intent. As shown later on MaterialLot, SupplyChainStageType, and UnitOfMeasure are examples of classes. Attributes describe values of the objects in a class and may be listed in a second portion of a class box. For example, name is an attribute of class UnitOfMeasure. By convention the attributes for a class are shown in one figure where the class is defined and the attributes are suppressed for all other places where a reference to the class occurs. Generalization organizes classes by their similarities and differences and is denoted by a triangle.

An association describes the relationship of objects of two or more classes and is indicated by a line. The adornment on each end of an association line denotes multiplicity. Multiplicity specifies how many instances of one class may relate to an instance of an associated class. A solid ball means 'many' (zero or more); a hollow ball means 'at most one' (zero or one); a line without a multiplicity symbol means exactly one.

Material Processing Package

Figure 5A:
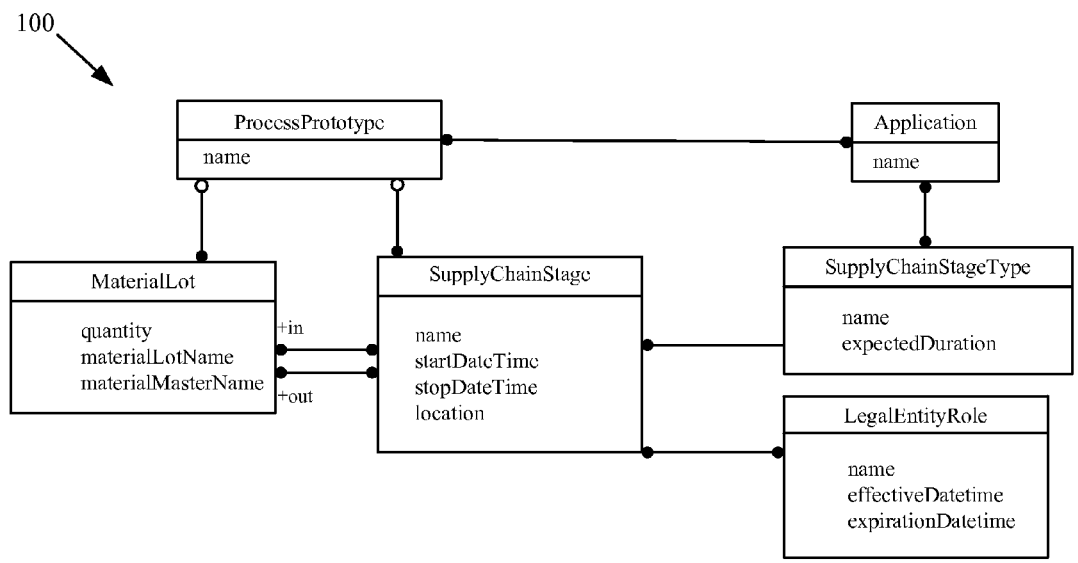

FIGS. 5A and SB show a software model 100 that allows tracing of the handling of food in object oriented notation. A SupplyChainStage 104 is an element of processing that is relevant to the handling of materials, such as food; examples include farming, manufacturing, inspection, approval, transport, and retail. A MaterialLot 106 is a substance relevant to the processing of a SupplyChainStage 104; examples include food items such as raw corn, washed corn, cooked corn, and canned corn as well as byproducts, wastes, chemicals, and pesticides. It can be appreciated that various processing elements and substances relevant to various processing elements can be used.

Figure 5B:
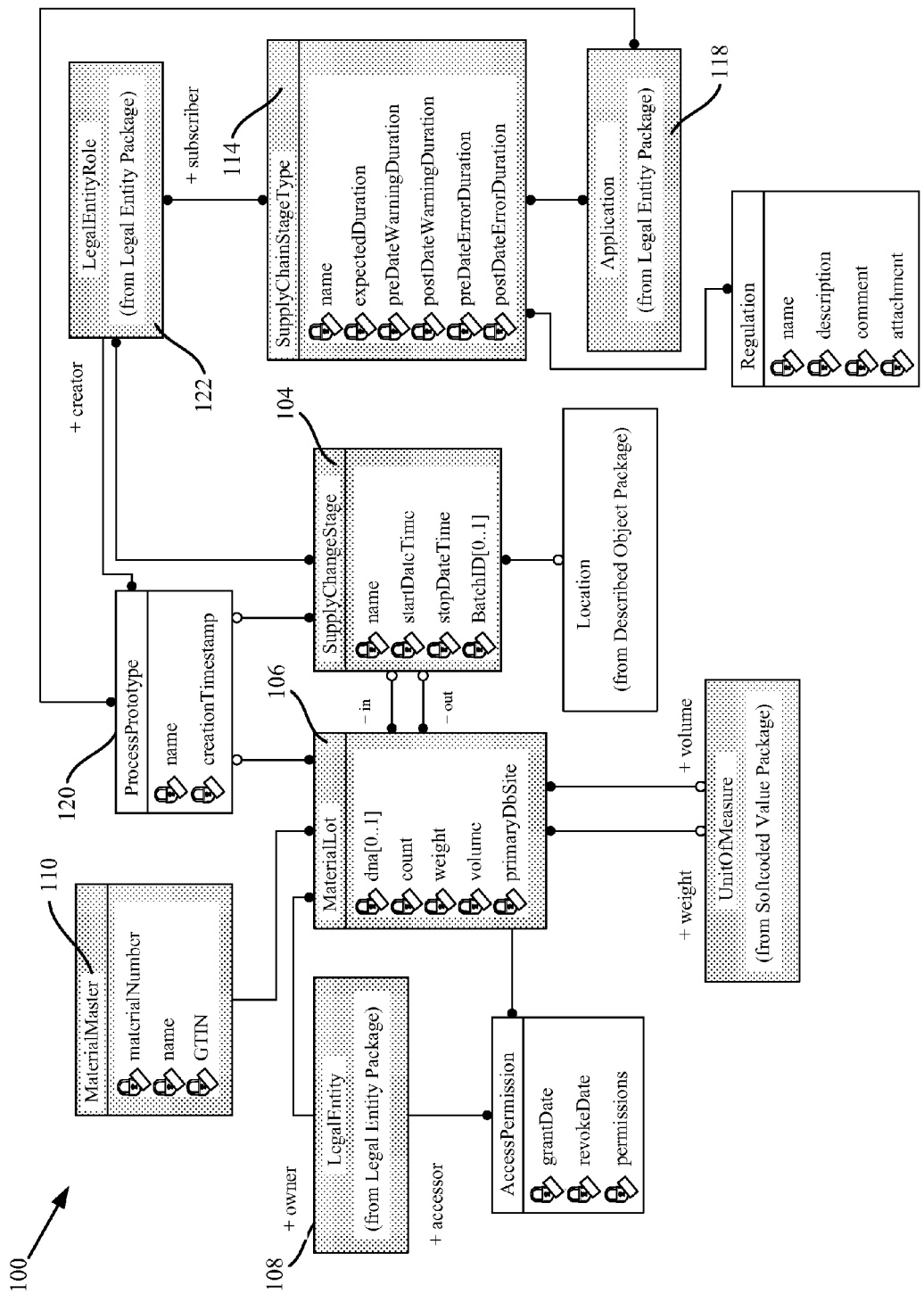

Because the present invention uses an object oriented model as shown in FIG. 5A and 5B, the present invention can create directed graphs that can be scaled to include any number of processing stages with any arrangement of parallel or serial processes or nodes of the directed graph. Also, the directed graph can be dynamically adapted. The present invention can also be readily distributed and can handle an arbitrarily complex process. The model 100 is customizable to any number of different manufacturing processes (e.g., corn, pineapple, shrimp, etc.) or company-specific practices.

The model 100 supports data distributed between multiple servers 42 over the network 46. As long as access permissions are granted, the present invention can navigate from computer to computer to trace the flow of foodstuffs.

Returning to the model 100 in FIG. 5B, the SupplyChainStage 104 may have any number of MaterialLot 106 as input and any number as output. The MaterialLot 106 may enter and exit at most one SupplyChainStage 104. Each MaterialLot 106 is associated with an owner LegalEntity 108 and any number of accessing LegalEntities 108. A MaterialLot 106 owner can give others permission to access the data. Only the owner or a designate of the owner (direct or indirect) can grant access permissions.

A MaterialMaster 110 stores general data. There is one MaterialMaster record for each Global Trade Item Number (GTIN). GTIN is an international standard item numbering that is replacing the European Article Number (EAN). The EAN in turn has replaced the UPC, Universal Product Code, that has been used in the US and Canada.

For example, when one picks up a can of corn in a store, there is a bar code on the can. This bar code is a GTIN. There is one MaterialMaster record for each GTIN. In contrast, there can be many cans of corn; each of which could be stored as a separate MaterialLot 106, all referring to a common MaterialMaster record.

A SupplyChainStageType 114 describes individual SupplyChainStages 104 in a similar manner to the way that MaterialMaster 110 describes MaterialLot 106. A SupplyChainStageType 114 has an expected duration (e.g., how long does it normally take to decob corn). Expected duration with time thresholds can be set for warning and error notices.

An Application 118 describes how various SupplyChainStageTypes 114 and their instances are grouped into unique applications. For example, an Application object includes a Farm Management application, a Quality Management Application, a Production Management Application, a Shipping and Logistics Management application, etc. Application 118 also describes how various ProcessPrototypes 120 are made available for an Application 118.

A LegalEntityRole 122 has multiple relationships with SupplyChainStages 104. For example, a person could be both a manager and an inspector. An effectiveDatetime and expirationDatetime data for Legal EntityRole 122 notes when the binding of the person and RoleType (Manager, inspector) is in effect. For example, one person may serve as manager of a department for a few years and then another person may move into the job. Many LegalEntityRoles 122 can own a SupplyChainStage 104.

A ProcessPrototype 120 is a group of MaterialLots 106 and SupplyChainStages 104, that would normally connect together into a directed graph. Each time there is a new processing run for food, the user must create a new directed graph to record the precise relationship between processing stages and material that flows in and out. It would be tedious to construct each of these graphs by hand, over and over again. The notion of a ProcessPrototype 120 allows for easy construction of a new graph -just find the correct ProcessPrototype 120 and clone it to get a new ProcessPrototype 120 that can be used for the next food-processing run. The notion of a ProcessPrototype 120 allows for easy construction of a new graph—just find the correct ProcessPrototype 120 and clone it by copying all instances of its associated MaterialLot and SupplyChainStage classes. These new copies can then be used for the next food-processing run. The ProcessPrototype 120 is used to define repeatable processes.

The model 100 is able to readily handle recursion. For example, Pakfood freezes shrimp and inventories them as part of routine processing. On occasion the frozen shrimp are added to a later batch to make up a shortfall in certain shrimp sizes. As far as the model 100 is concerned, the recycled shrimp are just another material lot and a trace reveals that the recycled shrimp are from an earlier production batch.

At the core of the present invention is the notion of a directed graph. The directed graph is a standard computer science construct. A directed graph consists of nodes that are connected by arcs from a source node to a target node. The nodes are supply chain stages and the arcs are material lots that enter and exit the supply chain stages.

The model permits both the definition of a process and the instantiation of a process to be defined at run time. The definition of a process is found in the SupplyChainStageType, MaterialMaster, and ProcessPrototype classes. SupplyChainStageType and MaterialMaster define pertinent attributes for supply chain stages and material lots respectively. The ProcessPrototype defines standard processes that are then cloned each time an instantiation is needed. The MaterialLot and SupplyChainStage classes are the primary classes used for the instantiation. The present invention provides run time definition and instantiation of food processes.

FIG. 6 is an illustrative example of SupplyChainStages 170, 172, 174 connected with intervening MaterialLots, 182, 184, 186, 188.

FIG. 7 shows a more complex example as compared to that shown in FIG. 6. In practice, any diagram with boxes and arrows constitute a valid directed graph and can be handled by the model 100. With regards to the model 100, a process is completely arbitrary. The definition of a process is a business decision and the model 100 accommodates any reasonable decision.

Legal Entity Package

Figure 8:
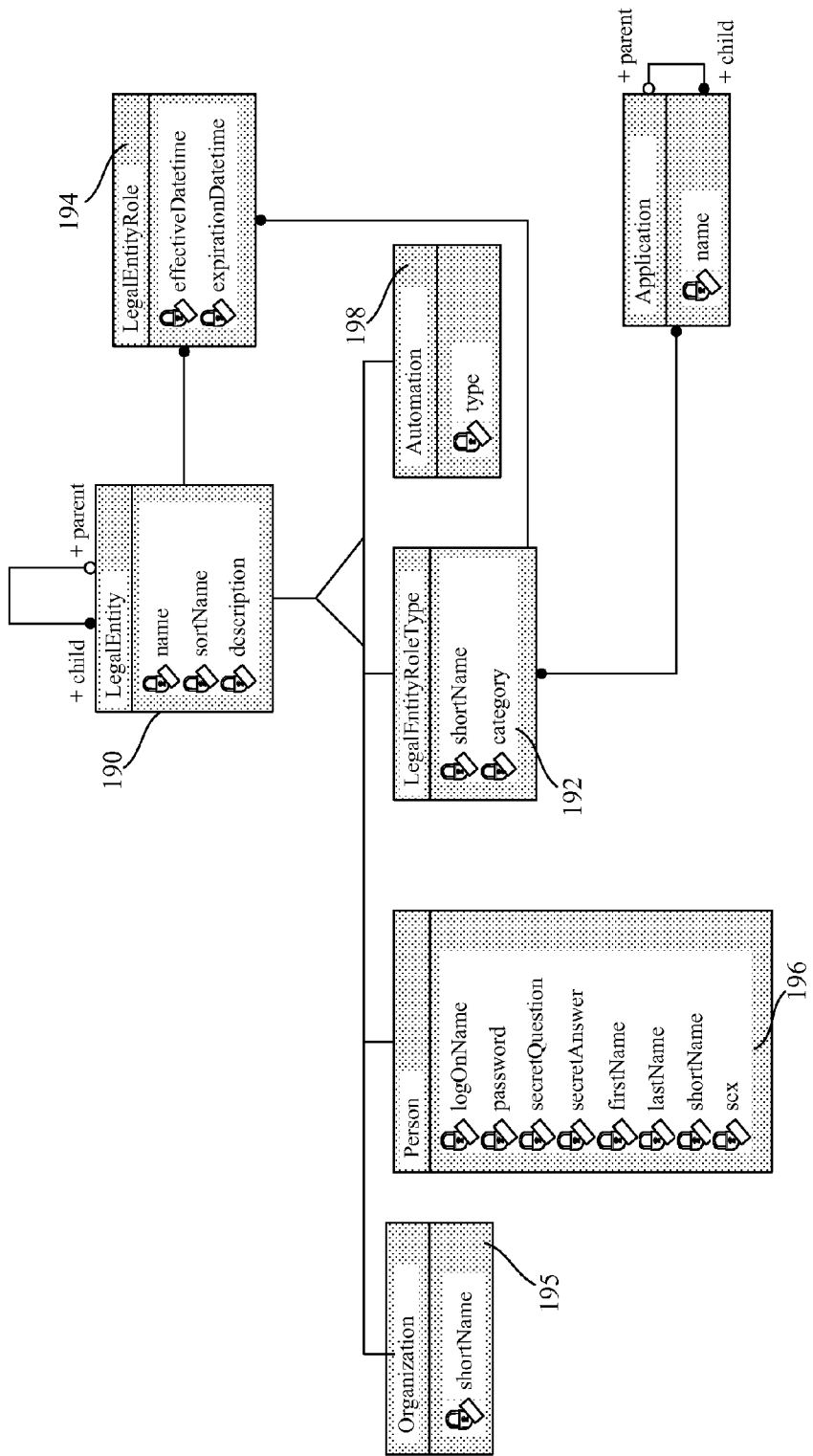

In FIG. 8, a LegalEntity 190 may be anyone of the following Organization 195, a Person 196, a LegalEntityRoleType 192, or an Automation 198. A LegalEntity 190 represents someone or something that is involved with the processing and handling of materials such as food. A LegalEntityRoleType 192 represents a job that a LegalEntity 190 fulfills. Purchasing agent, manager, and inspector are examples of LegalEntityRoleTypes 192. Many business functions can be served either by the running of software (Automation 198)—for these situations the effect of software cannot be distinguished from the efforts of Persons 196 and Organizations 195

A LegalEntityRole 194 combines a LegalEntity 190 with a LegalEntityRoleType 192. The LegalEntity 190 includes a parent-child relationship that LegalEntity 190 captures miscellaneous relationships between other LegalEntities 190. The association is recursive and LegalEntities 190 can be structured to an arbitrary depth. Thus, for example, a company (an Organization 195) can have multiple divisions (also Organizations 195), a division can have multiple departments (more Organizations 195), and a department can have multiple offices (still more Organizations 195).

Softcoded Value Package

Some classes in the model 100 can have an arbitrary number of attributes. For example, numerous attributes are stored for Persons 196, thus it is difficult to anticipate all of them in advance. Furthermore, the appropriate attributes can vary by customer, especially for MaterialLots 106 and SupplyChainStages 104. The software is tailorable for different food or even non-food materials and customer processes. The model 100 is a good fit for discrete batches of a material that are processed which characterizes the food industry and some other industries. It is also a fit for some continuous processes that can be approximated by a batch process.

Figure 9:
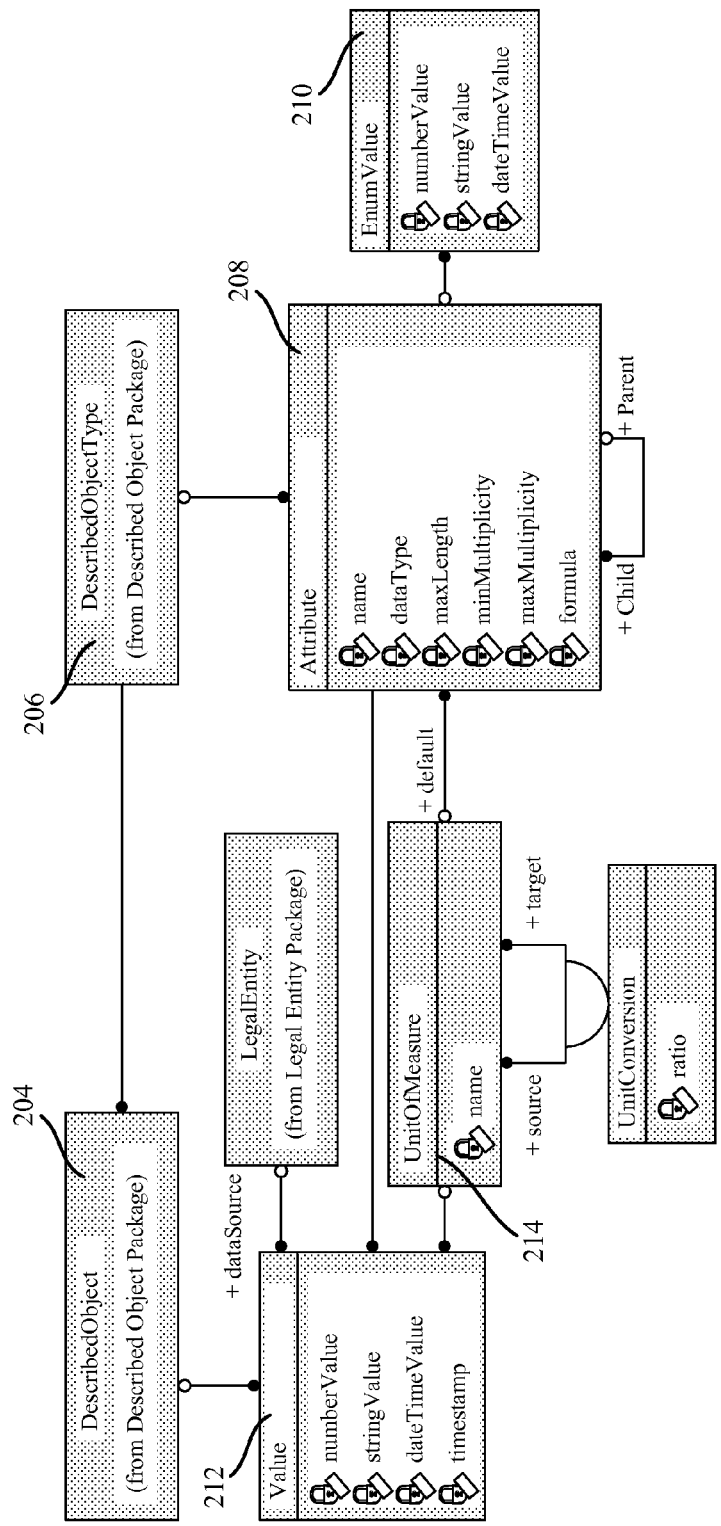

As shown in FIG. 9, the present invention includes a mechanism for softcoding attributes and defining them at run time. A DescribedObject 204 has softcoded Values 212. There is one record for each of the following objects: Person 196, MaterialLot 106, SupplyChainStage 104. Each DescribedObject 204 has a specific DescribedObjectType 206. Some examples of DescribedObjectTypes 206 are Person, various kinds of MaterialLots 106, and various kinds of SupplyChainStages 104. Thus there can be many Person DescribedObjects and each refers to a single Person DescribedObjectType record. Similarly, there can be many MaterialLot DescribedObjects each of which refers to the DescribedObjectType record for the kind of MaterialLot.

The model 100 states that DescribedObjects 204 must conform to Attribute 208 defined for the corresponding DescribedObjectType 206. A corresponding database cannot enforce this constraint, so application code must enforce it. Some Attributes 208 are enumerated and have a pick list of possible values. An EnumValue 210 stores pick list values when they apply.

Values 212 are any of the following data types: number, string, or datetime. One of the first three fields is filled in (and the other two are null) for each Value record. Each Value 212 has a timestamp and LegalEntity 190 that is the source of the value. Thus, the softcoded value mechanism keeps a history of values. A Value 212 has a UnitOfMeasure 214 that overrides the default specified for its Attribute 208.

Each Attribute 208 has a dataType (number, string, or datetime) indicating the appropriate field to fill in for each Value 212. String Values can have a maximum length. Minimum multiplicity indicates if a Value 212 of the Attribute 208 is required or optional for each DescribedObject 204. Similarly, maximum multiplicity indicates if a Value 212 of the Attribute 208 are single-valued or can be multiple-valued for each DescribedObject 204.

Some Attributes 208 are computed and have a corresponding formula. Formulas support simple arithmetic (−+* /), declarative if-then-else, and user defined functions. The functions can be invoked via a case statement using a label of the function name.

Described Object Package

Figure 10:
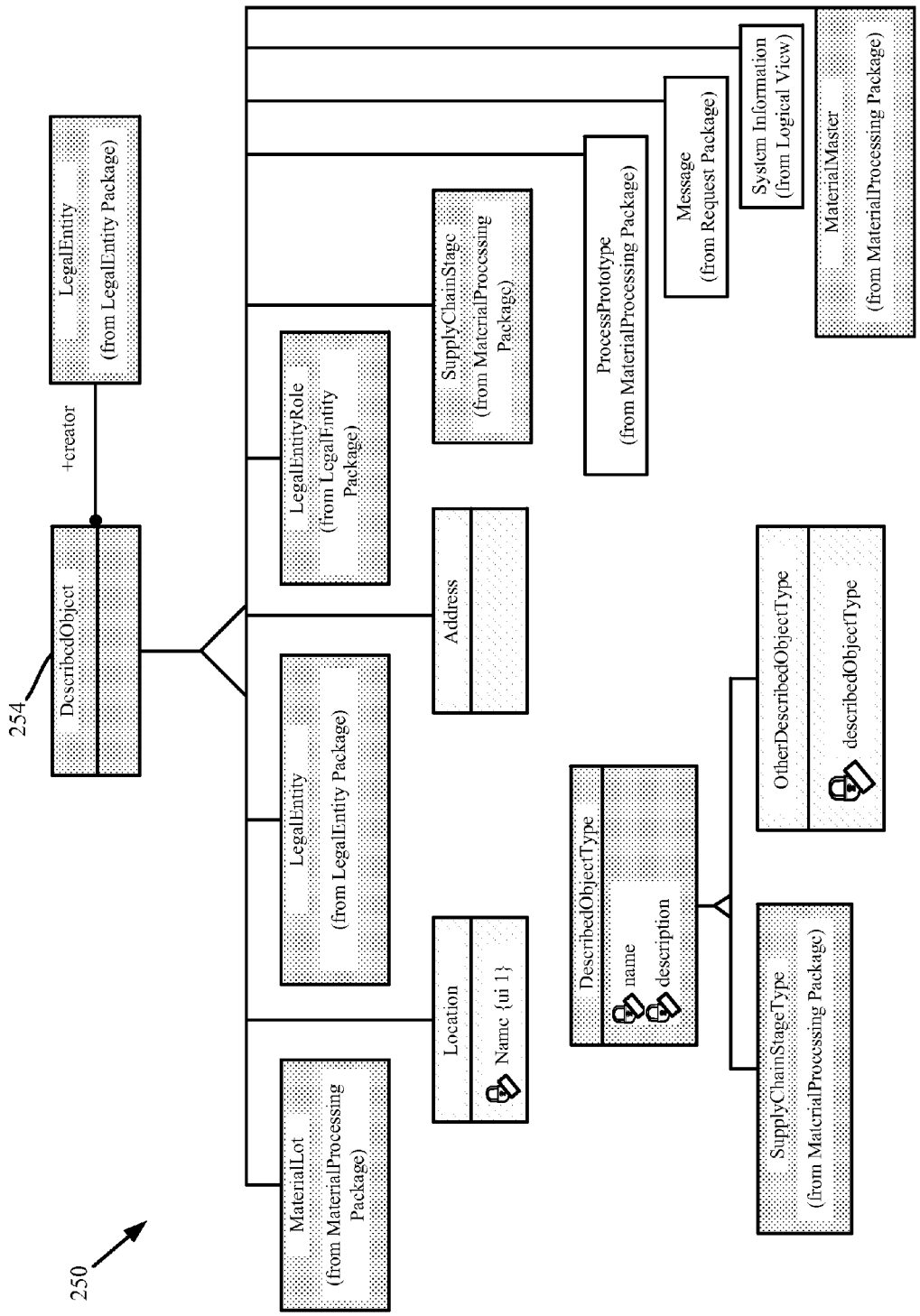

As shown in FIG. 10, the DescribedObjects 254 can have softcoded values or softcoded relationships.

Figure 11:
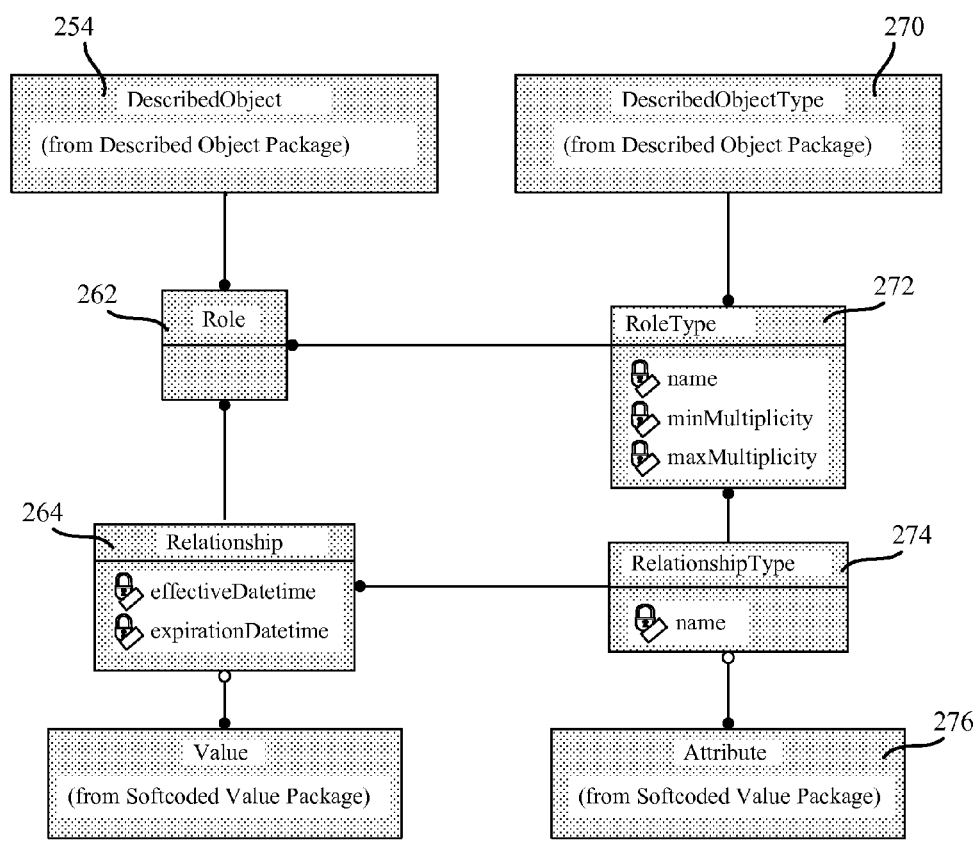

As shown in FIG. 11, the DescribedObject 254 is a placeholder for things that can have miscellaneous values and miscellaneous relationships. A DescribedObject 254 can have many Roles 262. A Role 262 is one end of a Relationship 264. Each Role corresponds to one DescribedObject 204 and one Relationship 264.

A Relationship 264 is a binding between Roles 262. Most Relationships 264 are binary, that is they have two Roles 262. A DescribedObject 254 may have any number of Roles 262 and may therefore participate in any number of Relationships 264. Each Relationship 264 has effective and expiration dates that allows history tracking. A Relationship 264 can be recorded in advance of when it is needed or after it becomes obsolete.

Metadata

As shown in FIG. 11, the DescribedObjectType 270 is a category for DescribedObjects 254. The DescribedObjectType 270 has one or many RoleTypes 272. The RoleType 272 is a category for Roles 262. By analogy, the RoleType 272 is one end of a RelationshipType 274. Each RoleType 272 corresponds to one DescribedObjectType 270 and one RelationshipType 274. MinMultiplicity is the minimum number of times that a DescribedObject 254 must participate in the Relationship 264 and is usually 0 or 1. MaxMultiplicity is the maximum number of times that a DescribedObject 254 can participate in the Relationship 264 and is usually 1 or many.

The RelationshipType 274 is a category for Relationships 264. The RelationshipType 274 can have Attributes 276 describing potential Relationship 264 values, just as the DescribedObjectType 270 can have Attributes 276 describing potential DescribedObject values 254. An Attribute 276 is a characteristic of the DescribedObject 254 or Relationship 264. Each Attribute 276 belongs to one of the following: DescribedObjectType 270 or RelationshipType 274.

Scenarios

Scenario 1

The following scenarios help describe the nature of change the food industry is subject to over time and how the present invention manages this change.

Figure 12:
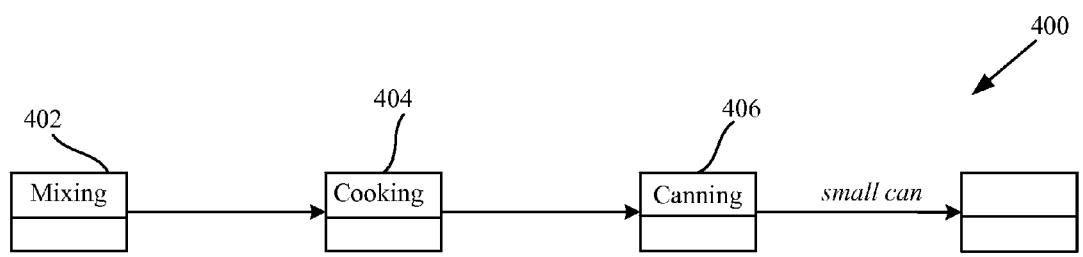
FIGS. 12-15 are directed graphs shown as examples of the present invention.

FIG. 12 shows a simple production line 400 for canned vegetables with the following production stages (mixing 402, cooking 404, canning 406). The following eleven tables represent the production process using the model of the present invention. The SupplyChainStages are owned by the LegalEntityRoles (Mixed fruit manufacturer and inspector A).

In the following tables, metadata is represented in with a background pattern. Application setup data is represented in Bold. All other data is Transaction Data.

TABLE 1

| SupplyChainStageType | | |
| --- | --- | --- |
| Stage TypeID (PK) | Stage Type Name | Stage Duration |
| 1 | Mixing | 0:10 |
| 2 | Cooking | 0:30 |
| 3 | Canning | 0:10 |

Table 1 is a SupplyChainStageType table that includes metadata that represents each of the supply chain stage types. There can be any number of stage types for an application.

TABLE 2

| SupplyChainStage | | | | | |
| --- | --- | --- | --- | --- | --- |
| StageID (PK) | Stage Name | StageTypeID (FK) | StageStartDateTime | StageStop DateTime | StageLocation | ProcessProtoTypeID |
| 1 | Mixing | 1 | | | Singapore | 1 |
| 2 | Cooking | 2 | | | Singapore | 1 |
| 3 | Canning | 3 | | | Singapore | 1 |
| 4 | Mixing | 1 | 9:00 | 9:10 | Singapore | |
| 5 | Cooking | 2 | 9:10 | 9:40 | Singapore | |
| 6 | Canning | 3 | 9:50 | 10:00 | Singapore | |

Table 2 is a SupplyChainStage table that stores various day-to-day operations and associated data. Table 2 is used to store dummy process data, which is used to create ProcessPrototype clones. The user can easily represent complex processes and create clones (copies) for ease of day-to-day data entry operations.

TABLE 3

| Material Lot | | | |
| --- | --- | --- | --- |
| Material LotID | MaterialLotName | MaterialMaster Name | Material- Quantity | ProcessProtoTypeID(FK) |
| 1 | Mixed Fruits | | | 1 |
| 2 | Cooked Fruits | | | 1 |

TABLE 3-continued

| Material Lot | | | |
| --- | --- | --- | --- |
| Material LotID | MaterialLotName | MaterialMaster Name | Material- Quantity | ProcessProtoTypeID(FK) |
| 3 | Canned Fruits | | | 1 |
| 4 | Mixed Fruits | | 100 | |
| 5 | Cooked Fruits | | 55 | |
| 6 | Canned Fruits | | 25 | |

Table 3 is a MaterialLot table that is used to store information of various Material Lots used in the SupplyChainStages. Table 3 has dummy materials for the prototype and actual materials with values.

Table 4: Process Prototype

Table 4 is a ProcessPrototype table that includes metadata that represents a set of stages and MaterialLot from the real SupplyChain process run. The user can create a dummy run first and then create a new ProcessProtoType from it. Table 4 holds all the related information of the PrototypeName metadata and a dummy process is identified by the Prototype Name. The user can easily add new SupplyChainStages, delete existing SupplyChainStageStages, and change the direction of the supply chain.

TABLE 5

| Application | |
| --- | --- |
| ApplicationID | Application Name |
| 1 | Mixed Fruit Production Trace |

Table 5 is an Application table that defines all the SupplyChainStageTypes and ProcessPrototypes that are available for the application. A group of SupplyChainStages are defined as belonging to an Application. For example, in a sweet corn process the following component applications are used: Farm component; Quality component; and Production component.

TABLE 6

| LegalEntity Role | | | |
| --- | --- | --- | --- |
| LegalEntity RoleID | LegalEntity- RoleName | LegalEntityEffective Datetime | LegalEntityexpiration Datetime |
| 1 | Inspector A | Jan. 1, 2002 9:00 | |
| 2 | Mixed Fruit Manufacturer | Jan. 1, 2000 10:00 | |

Table 6 is a LegalEntityRole table that stores the information of various legal entity roles. The manufacturer (e.g., Mixed Fruit Manufacturer) own some SupplyChain stages. The inspector who plays a role in the inspection process may also be related to the same SupplyChain Stages as the manufacturer.

TABLE 7

MaterialLot IN SupplyChainStage

| MaterialLotID | SupplyChainStageID |
|---|---|
| 1 | 2 |
| 2 | 3 |
| 4 | 5 |
| 5 | 6 |

TABLE 8

MaterialLot OUT SupplyChainStage

| MaterialLotID | SupplyChainStageID |
|---|---|
| 1 | 1 |
| 2 | 2 |
| 3 | 3 |
| 4 | 4 |
| 5 | 5 |
| 6 | 6 |

Tables 7 and 8 are used to store information of various Material Lots used in the SupplyChainStages. Materials going IN and material going OUT connect the SupplyChainStages.

TABLE 9

ProcessProtoType Application

| ProcessProtoTypeID | ApplicationID |
|---|---|
| 1 | 1 |

Table 9 stores the information of which process prototypes are available for the application.

TABLE 10

SupplyChainStageType Application

| SupplyChainStageTypeID | ApplicationID |
|---|---|
| 1 | 1 |
| 2 | 1 |
| 3 | 1 |

Table 10 stores the information of which SupplyChainStage types are available for the application. For example, SupplyChainStage type structures are defined for Farm Inspection, Production, Quality, Shipping, etc and the application would make use of the defined structures.

TABLE 11

SupplyChainStage LegalEntityRole

| SupplyChainStageID | LegalEntityRoleID |
|---|---|
| 1 | 2 |
| 2 | 2 |
| 3 | 2 |
| 4 | 1 |
| 5 | 1 |
| 6 | 1 |
| 4 | 2 |
| 5 | 2 |
| 6 | 2 |

Table 11 stores the information of which SupplyChainStage types were created or modified by which legalEntity role (person) and to which organization legal entity the SupplyChainStage belongs to.

Scenario 2

In Scenario 2 a new parallel production line is add to Scenario 1. A company has set up a new parallel production line. An additional capacity for the Canning process is added. Now the company has the two canning lines Canning B1 and Canning B2. The output of the Canning B1 line is Canned Fruits Small Can and the output of the Canning B2 line is Canned Fruits Large Can.

Figure 13:
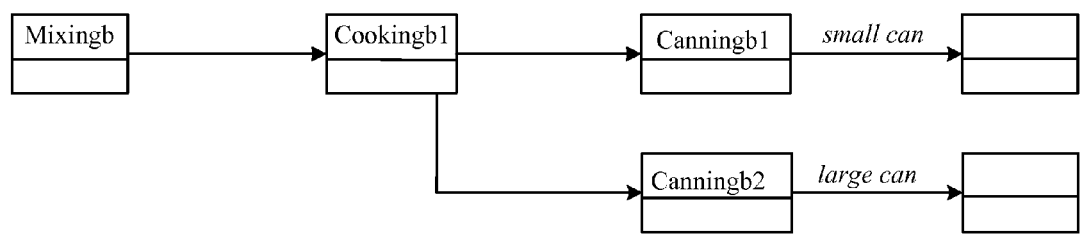

The SupplyChainStages are show in FIG. 13.

Metadata is represented with background shading, Application setup data is represented in Bold, and all other data is Transaction Data.

TABLE 12

SupplyChainStageType

| StageType | StageTypeName | StageDuration |
|---|---|---|
| 1 | Mixing | 0:10 |
| 2 | Cooking | 0:30 |
| 3 | Canning Small Cans | 0:10 |
| 4 | Canning Large Cans | 0:13 |

In the above table a SupplyChainStage type is defined to record the activities in the Canning Large Cans process line.

TABLE 13

SupplyChainStage

| StageID (PK) | Stage Name | StageType ID (FK) | StageStartDate Time | StageStop DateTime | StageLocation | Process ProtoTypeID |
|---|---|---|---|---|---|---|
| 1 | Mixing | 1 | | | Singapore | 1 |
| 2 | Cooking | 2 | | | Singapore | 1 |
| 3 | Canning | 3 | | | Singapore | 1 |
| 4 | Mixing | 1 | Jan. 3, 2002 9:00 | Jan. 3, 2002 9:10 | Singapore | |
| 5 | Cooking | 2 | Jan. 3, 2002 9:10 | Jan. 3, 2002 9:40 | Singapore | |
| 6 | Canning | 3 | Jan. 3, 2002 9:50 | Jan. 3, 2002 10:00 | Singapore | |

TABLE 13-continued

SupplyChainStage

| StageID (PK) | Stage Name | StageType ID (FK) | StageStartDate Time | StageStop DateTime | StageLocation | Process ProtoTypeID |
|---|---|---|---|---|---|---|
| 7 | Canning B2 | 4 | | | Singapore | 1 |
| 8 | Mixing | 1 | Feb. 3, 2002 9:00 | Feb. 3, 2002 9:10 | Singapore | |
| 9 | Cooking | 2 | Feb. 3, 2002 9:10 | Feb. 3, 2002 9:40 | Singapore | |
| 10 | Canning B1 | 3 | Feb. 3, 2002 9:50 | Feb. 3, 2002 10:00 | Singapore | |
| 11 | Canning B2 | 4 | Feb. 3, 2002 9:50 | Feb. 3, 2002 10:03 | Singapore | |

TABLE 14

Material Lot

| Material LotID | MaterialLotName | MaterialMaster Name | Material Quantity | ProcessProto TypeID(FK) |
|---|---|---|---|---|
| 1 | Mixed Fruits | | | 1 |
| 2 | Cooked Fruits | | | 1 |
| 3 | Canned Fruits Small | | | 1 |
| 4 | Mixed Fruits | | 100 | |
| 5 | Cooked Fruits | | 90 | |
| 6 | Canned Fruits Small | | 9 | |
| 7 | Cooked Fruits | | | 1 |
| 8 | Canned Fruits Large | | | 1 |
| 9 | Mixed Fruits | | 200 | |
| 10 | Cooked Fruits | | 100 | |
| 11 | Cooked Fruits | | 100 | |
| 12 | Canned Fruits Small | | 9 | |
| 13 | Canned Fruits Large | | 7 | |

TABLE 15

Process Prototype

| ProcessProtoTypeID (PK) | PrototypeName |
|---|---|
| 1 | New prototype with canning for Large cans |

TABLE 16

Application

| ApplicationID | Application Name |
|---|---|
| 1 | Mixed Fruit Production Trace |

TABLE 17

LegalEntity Role

| LegalEntity-RoleID | LegalEntity-RoleName | LegalEntity-EffectiveDatetime | LegalEntity-expirationDatetime |
|---|---|---|---|
| 1 | Inspector A | Jan. 1, 2002 9:00 | |
| 2 | Mixed Fruit Manufacturer | Jan. 1, 2000 10:00 | |

TABLE 18

MaterialLot IN SupplyChainStage

| MaterialLotID | SupplyChainStageID |
|---|---|
| 1 | 2 |
| 2 | 3 |
| 4 | 5 |
| 5 | 6 |

TABLE 18-continued

MaterialLot IN SupplyChainStage

| MaterialLotID | SupplyChainStageID |
|---|---|
| 7 | 7 |
| 9 | 9 |
| 10 | 10 |
| 11 | 11 |

TABLE 19

MaterialLot OUT SupplyChainStage

| MaterialLotID | SupplyChainStageID |
|---|---|
| 1 | 1 |
| 2 | 2 |
| 3 | 3 |
| 4 | 4 |
| 5 | 5 |
| 6 | 6 |
| 8 | 7 |
| 9 | 8 |
| 10 | 9 |
| 11 | 9 |
| 12 | 10 |
| 13 | 11 |

Tables 18 and 19 are used to store information of various Material Lots used in the SupplyChainStages. Materials going IN and material going OUT connect the SupplyChainStages.

TABLE 20

ProcessProtoType Application

| ProcessProtoTypeID | ApplicationID |
|---|---|
| 1 | 1 |

TABLE 21

SupplyChainStageType Application

| SupplyChainStageTypeID | ApplicationID |
|---|---|
| 1 | 1 |
| 2 | 1 |
| 3 | 1 |
| 4 | 1 |

TABLE 22

SupplyChainStage LegalEntityRole

| SupplyChainStageID | LegalEntityRoleID |
|---|---|
| 1 | 2 |
| 2 | 2 |
| 3 | 2 |
| 4 | 1 |
| 5 | 1 |
| 6 | 1 |
| 4 | 2 |
| 5 | 2 |
| 6 | 2 |

TABLE 23

SupplyChainStageType

| StageTypeID(PK) | StageTypeName | StageDuration |
|---|---|---|
| 1 | Mixing | 0:10 |
| 2 | Cooking | 0:30 |
| 3 | Canning Small Cans | 0:10 |
| 4 | Canning Large Cans | 0:13 |
| 5 | CCP Small Cans | 0:05 |
| 6 | CCP Large Cans | 0:07 |

TABLE 24

SupplyChainStage

| StageID (PK) | Stage Name | StageType ID (FK) | StageStartDateTime | StageStop DateTime | StageLocation | Process ProtoTypeID |
|---|---|---|---|---|---|---|
| 1 | Mixing | 1 | | | Singapore | 1 |
| 2 | Cooking | 2 | | | Singapore | 1 |
| 3 | Canning B1 | 3 | | | Singapore | 1 |
| 4 | Mixing | 1 | Jan. 3, 2002 9:00 | Jan. 3, 2002 9:10 | Singapore | |
| 5 | Cooking | 2 | Jan. 3, 2002 9:10 | Jan. 3, 2002 9:40 | Singapore | |
| 6 | Canning | 3 | Jan. 3, 2002 9:50 | Jan. 3, 2002 10:00 | Singapore | |
| 7 | Canning B2 | 4 | | | Singapore | 1 |
| 8 | Mixing | 1 | Feb. 3, 2002 9:00 | Feb. 3, 2002 9:10 | Singapore | |
| 9 | Cooking | 2 | Feb. 3, 2002 9:10 | Feb. 3, 2002 9:40 | Singapore | |
| 10 | Canning B1 | 3 | Feb. 3, 2002 9:50 | Feb. 3, 2002 10:00 | Singapore | |
| 11 | Canning B2 | 4 | Feb. 3, 2002 9:50 | Feb. 3, 2002 10:03 | Singapore | |
| 12 | CCP Small Cans | 5 | | | Singapore | 1 |
| 13 | CCP Large Cans | 6 | | | Singapore | 1 |
| 14 | Mixing | 1 | Jan. 10, 2003 9:00 | Jan. 10, 2003 9:10 | Singapore | |
| 15 | Cooking | 2 | Jan. 10, 2003 9:10 | Jan. 3, 2002 9:40 | Singapore | |
| 16 | Canning B1 | 3 | Jan. 10, 2003 9:50 | Jan. 10, 2003 10:00 | Singapore | |
| 17 | Canning B2 | 4 | Jan. 10, 2003 9:50 | Jan. 10, 2003 10:03 | Singapore | |
| 18 | CCP Small Cans | 5 | Jan. 10, 2003 10:00 | Jan. 10, 2003 10:05 | Singapore | |
| 19 | CCP Large Cans | 6 | Jan. 10, 2003 10:03 | Jan. 10, 2003 10:10 | Singapore | |

TABLE 22-continued

SupplyChainStage LegalEntityRole

| SupplyChainStageID | LegalEntityRoleID |
|---|---|
| 8 | 1 |
| 9 | 1 |
| 10 | 1 |
| 11 | 1 |
| 8 | 2 |
| 9 | 2 |
| 10 | 2 |
| 11 | 2 |

TABLE 25

Material Lot

| Material-LotID | MaterialLotName | Material-MasterName | Material-Quantity | ProcessProtoTypeID (FK) |
|---|---|---|---|---|
| 1 | Mixed Fruits | | | 1 |
| 2 | Cooked Fruits | | | 1 |
| 3 | Canned Fruits Small | | | 1 |
| 4 | Mixed Fruits | | 100 | |
| 5 | Cooked Fruits | | 90 | |
| 6 | Canned Fruits Small | | 9 | |
| 7 | Cooked Fruits | | | 1 |
| 8 | Canned Fruits Large | | | 1 |
| 9 | Mixed Fruits | | 200 | |
| 10 | Cooked Fruits | | 100 | |
| 11 | Cooked Fruits | | 100 | |
| 12 | Canned Fruits Small | | 9 | |
| 13 | Canned Fruits Large | | 7 | |
| 14 | Cooled Small Cans | | | 1 |
| 15 | Cooled Large Cans | | | 1 |
| 16 | Mixed Fruits | | 300 | |
| 17 | Cooked Fruits | | 200 | |
| 18 | Cooked Fruits | | 100 | |
| 19 | Canned Fruits Small | | 9 | |
| 20 | Canned Fruits Large | | 7 | |
| 21 | Cooled Small Cans | | 9 | |
| 22 | Cooled Large Cans | | 7 | |

Table 22 stores the information of which SupplyChainStage types was created or modified by the given legalEntity role (person) and to which organization legal entity the SupplyChainStage belongs to.

Scenario 3

In Scenario 3 a new cooling and CCP point are added to the production line of Scenario 2. The output of the Canning process line is sent to a new process line for cooling. There are separate cooling lines for Small Cans and Large Cans.

Figure 14:
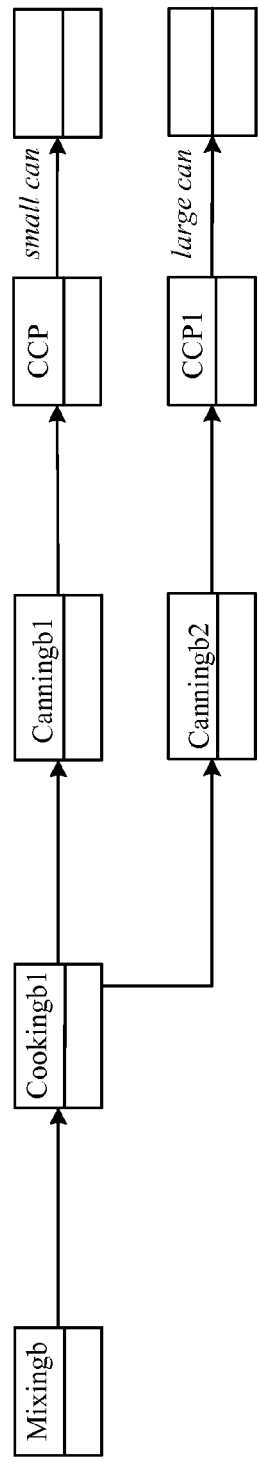

The typical SupplyChainStages are show in the above FIG. 14. As a first step, the existing clone to support the new Cooling Process is modified. Two new stage types CCP for Small Can and CCP1 for large Can are declared.

TABLE 26

Process Prototype

| ProcessProtoTypeID (PK) | PrototypeName |
|---|---|
| 1 | New prototype with canning for large cans |

TABLE 27

Application

| ApplicationID | Application Name |
|---|---|
| 1 | Mixed Fruit Production Trace |

TABLE 28

LegalEntity Role

| LegalEntityRoleID | LegalEntityRoleName | LegalEntityEffective Datetime | LegalEntityexpiration Datetime |
|---|---|---|---|
| 1 | Inspector A | Jan. 1, 2002 9:00 | |
| 2 | Mixed Fruit Manufacturer | Jan. 1, 2000 10:00 | |

TABLE 29

MaterialLot IN SupplyChainStage

| MaterialLotID | SupplyChainStageID |
|---|---|
| 1 | 2 |
| 2 | 3 |
| 4 | 5 |
| 5 | 6 |
| 7 | 7 |
| 9 | 9 |
| 10 | 10 |
| 11 | 11 |
| 3 | 12 |
| 8 | 13 |
| 16 | 15 |
| 17 | 16 |
| 18 | 17 |
| 19 | 18 |
| 20 | 19 |

TABLE 30

MaterialLot OUT SupplyChainStage

| MaterialLotID | SupplyChainStageID |
|---|---|
| 1 | 1 |
| 2 | 2 |
| 3 | 3 |
| 4 | 4 |
| 5 | 5 |
| 6 | 6 |
| 7 | 2 |
| 8 | 7 |
| 9 | 8 |
| 10 | 9 |
| 11 | 9 |
| 12 | 10 |
| 13 | 11 |
| 14 | 12 |
| 15 | 13 |
| 16 | 14 |
| 17 | 15 |
| 18 | 15 |

TABLE 30-continued

MaterialLot OUT SupplyChainStage

| MaterialLotID | SupplyChainStageID |
|---|---|
| 19 | 16 |
| 20 | 17 |
| 21 | 18 |
| 22 | 19 |

TABLE 31

ProcessProtoType Application

| ProcessProtoTypeID | ApplicationID |
|---|---|
| 1 | 1 |

TABLE 32

SupplyChainStageType Application

| SupplyChainStageTypeID | ApplicationID |
|---|---|
| 1 | 1 |
| 2 | 1 |
| 3 | 1 |
| 4 | 1 |
| 5 | 1 |
| 6 | 1 |

TABLE 33

SupplyChainStage LegalEntityRole

| SupplyChainStageID | LegalEntityRoleID |
|---|---|
| 1 | 2 |
| 2 | 2 |
| 3 | 2 |
| 4 | 1 |
| 5 | 1 |
| 6 | 1 |
| 4 | 2 |
| 5 | 2 |
| 6 | 2 |
| 7 | 2 |
| 8 | 1 |
| 9 | 1 |
| 10 | 1 |
| 11 | 1 |
| 8 | 2 |
| 9 | 2 |
| 10 | 2 |
| 11 | 2 |
| 12 | 2 |
| 13 | 2 |
| 14 | 1 |
| 15 | 1 |
| 16 | 1 |
| 17 | 1 |
| 18 | 1 |
| 19 | 1 |
| 14 | 2 |
| 15 | 2 |
| 16 | 2 |
| 17 | 2 |
| 18 | 2 |
| 19 | 2 |

Scenario 4

In Scenario 4 the company has added a new cooking capacity to the production line of Scenario 3. The output of the Cooking B1 and Cooking B2 process line is sent to a new process line for Canning. There are separate cooling lines for Small Cans and Large Cans. The output of the SupplyChainStages Cooking B1 and Cooking B2 are sent to a common process for merging to mix the materials into one. The output of the Merging process is sent to Canning B1 or Canning B2 process line.

Figure 15:
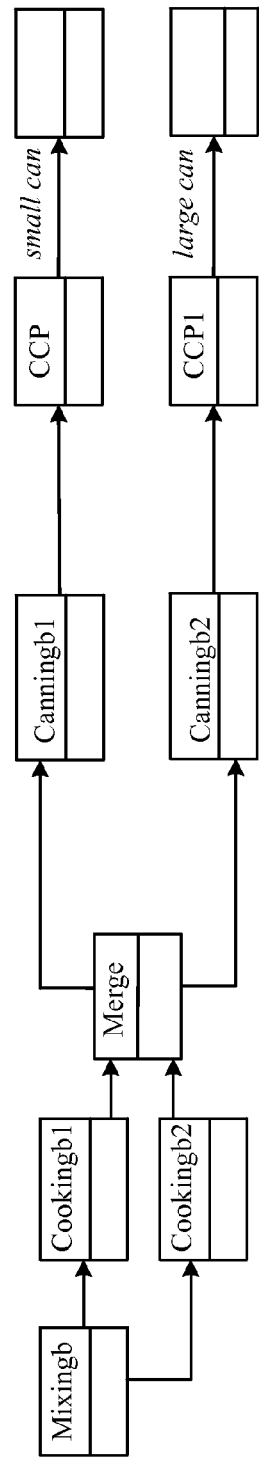

The SupplyChainStages are show in FIG. 15. As a first step, the existing clone to support the new Cooking Process is modified. The existing Cooking Stage would be renamed as Cooking B1 and a new line added called Cooking B2. The output of these processes would be merged in the process Merge.

TABLE 34

SupplyChainStageType

| StageTypeID(PK) | StageTypeName | StageDuration |
|---|---|---|
| 1 | Mixing | 0:10 |
| 2 | Cooking B1 | 0:30 |
| 3 | Canning Small Cans | 0:10 |
| 4 | Canning Large cans | 0:13 |
| 5 | CCP Small Cans | 0:05 |
| 6 | CCP Large Cans | 0:07 |
| 7 | Cooking B2 | 0:30 |
| 8 | Merge | 0:10 |

TABLE 35

SupplyChainStage

| StageID (PK) | Stage Name | StageType ID (FK) | StageStartDateTime | StageStop DateTime | StageLocation | Process ProtoTypeID |
|---|---|---|---|---|---|---|
| 1 | Mixing | 1 | | | Singapore | 1 |
| 2 | Cooking | 2 | | | Singapore | 1 |
| 3 | Canning B1 | 3 | | | Singapore | 1 |
| 4 | Mixing | 1 | Jan. 3, 2002 9:00 | Jan. 3, 2002 9:10 | Singapore | |
| 5 | Cooking | 2 | Jan. 3, 2002 9:10 | Jan. 3, 2002 9:40 | Singapore | |
| 6 | Canning | 3 | Jan. 3, 2002 9:50 | Jan. 3, 2002 10:00 | Singapore | |
| 7 | Canning B2 | 4 | | | Singapore | 1 |
| 8 | Mixing | 1 | Feb. 3, 2002 9:00 | Feb. 3, 2002 9:10 | Singapore | |
| 9 | Cooking | 2 | Feb. 3, 2002 9:10 | Feb. 3, 2002 9:40 | Singapore | |
| 10 | Canning B1 | 3 | Feb. 3, 2002 9:50 | Feb. 3, 2002 10:00 | Singapore | |
| 11 | Canning B2 | 4 | Feb. 3, 2002 9:50 | Feb. 3, 2002 10:03 | Singapore | |
| 12 | CCP Small Cans | 5 | | | Singapore | 1 |
| 13 | CCP Large Cans | 6 | | | Singapore | 1 |
| 14 | Mixing | 1 | Jan. 10, 2003 9:00 | Jan. 10, 2003 9:10 | Singapore | |
| 15 | Cooking | 2 | Jan. 10, 2003 9:10 | Jan. 3, 2002 9:40 | Singapore | |
| 16 | Canning B1 | 3 | Jan. 10, 2003 9:50 | Jan. 10, 2003 10:00 | Singapore | |
| 17 | Canning B2 | 4 | Jan. 10, 2003 9:50 | Jan. 10, 2003 10:03 | Singapore | |
| 18 | CCP Small Cans | 5 | Jan. 10, 2003 10:00 | Jan. 10, 2003 10:05 | Singapore | |
| 19 | CCP Large Cans | 6 | Jan. 10, 2003 10:03 | Jan. 10, 2003 10:10 | Singapore | |
| 20 | Mixing | 1 | | | Singapore | 2 |
| 21 | Cooking B1 | 2 | | | Singapore | 2 |
| 22 | Cooking B2 | 7 | | | Singapore | 2 |
| 23 | Merge | 8 | | | Singapore | 2 |
| 24 | Canning B1 | 3 | | | Singapore | 2 |
| 25 | Canning B2 | 4 | | | Singapore | 2 |
| 26 | CCP Small Cans | 5 | | | Singapore | 2 |
| 27 | CCP Large Cans | 6 | | | Singapore | 2 |
| 28 | Mixing | 1 | Feb. 10, 2004 9:00 | Feb. 10, 2004 9:10 | Singapore | |
| 29 | Cooking B1 | 2 | Feb. 10, 2004 9:10 | Feb. 10, 2004 9:40 | Singapore | |
| 30 | Cooking B2 | 7 | Feb. 10, 2004 9:10 | Feb. 10, 2004 9:40 | Singapore | |
| 31 | Merge | 8 | Feb. 10, 2004 9:40 | Feb. 10, 2004 9:50 | Singapore | |
| 32 | Canning B1 | 3 | Feb. 10, 2004 9:50 | Feb. 10, 2004 10:00 | Singapore | |
| 33 | Canning B2 | 4 | Feb. 10, 2004 9:50 | Feb. 10, 2004 10:03 | Singapore | |
| 34 | CCP Small Cans | 5 | Feb. 10, 2004 10:03 | Feb. 10, 2004 10:08 | Singapore | |
| 35 | CCP Large Cans | 6 | Feb. 10, 2004 10:03 | Feb. 10, 2004 10:10 | Singapore | |

TABLE 36

Material Lot

| Material-LotID | MaterialLotName | Material-MasterName | Material-Quantity | ProcessProtoTypeID(FK) |
|---|---|---|---|---|
| 1 | Mixed Fruits | | | 1 |
| 2 | Cooked Fruits | | | 1 |
| 3 | Canned Fruits Small | | | 1 |
| 4 | Mixed Fruits | | 100 | |
| 5 | Cooked Fruits | | 90 | |
| 6 | Canned Fruits Small | | 9 | |
| 7 | Cooked Fruits | | | 1 |
| 8 | Canned Fruits Large | | | 1 |
| 9 | Mixed Fruits | | 200 | |
| 10 | Cooked Fruits | | 100 | |
| 11 | Cooked Fruits | | 100 | |
| 12 | Canned Fruits Small | | 9 | |
| 13 | Canned Fruits Large | | 7 | |
| 14 | Cooled Small Cans | | | 1 |
| 15 | Cooled Large Cans | | | 1 |
| 16 | Mixed Fruits | | 300 | |
| 17 | Cooked Fruits | | 200 | |
| 18 | Cooked Fruits | | 100 | |
| 19 | Canned Fruits Small | | 9 | |
| 20 | Canned Fruits Large | | 7 | |
| 21 | Cooled Small Cans | | 9 | |
| 22 | Cooled Large Cans | | 7 | |
| 23 | Mixed Fruits | | | 2 |
| 24 | Mixed Fruits | | | 2 |

TABLE 36-continued

Material Lot

| Material-LotID | MaterialLotName | Material-MasterName | Material-Quantity | ProcessProtoTypeID(FK) |
|---|---|---|---|---|
| 25 | Cooked Fruits b1 | | | 2 |
| 26 | Cooked Fruits b2 | | | 2 |
| 27 | Merge Fruits B1 | | | 2 |
| 28 | Merge Fruits B2 | | | 2 |
| 29 | Canned Fruits Small | | | 2 |
| 30 | Canned Fruits Large | | | 2 |
| 31 | Cooled Small Cans | | | 2 |
| 32 | Cooled Large Cans | | | 2 |
| 33 | Mixed Fruits | | | |
| 34 | Mixed Fruits | | | |
| 35 | Cooked Fruits b1 | | | |
| 36 | Cooked Fruits b2 | | | |
| 37 | Merge Fruits B1 | | | |
| 38 | Merge Fruits B2 | | | |
| 39 | Canned Fruits Small | | | |
| 40 | Canned Fruits Large | | | |
| 41 | Cooled Small Cans | | | |
| 42 | Cooled Large Cans | | | |

TABLE 37

Process Prototype

| ProcessProtoTypeID (PK) | PrototypeName |
|---|---|
| 1 | New prototype with canning for Large cans |
| 2 | Latest production with two cooking lines |

TABLE 38

Application

| ApplicationID | Application Name |
|---|---|
| 1 | Mixed Fruit Production Trace |

TABLE 39

LegalEntity Role

| LegalEntityRoleID | LegalEntityRoleName | LegalEntityEffectiveDatetime | LegalEntityexpirtaionDatetime |
|---|---|---|---|
| 1 | Inspector A | Jan. 1, 2002 9:00 | |
| 2 | Mixed Fruit Manufacturer | Jan. 1, 2000 10:00 | |

TABLE 40

MaterialLot IN SupplyChainStage

| MaterialLotID | SupplyChainStageID |
|---|---|
| 1 | 2 |
| 2 | 3 |
| 4 | 5 |
| 5 | 6 |
| 7 | 7 |
| 9 | 9 |
| 10 | 10 |
| 11 | 11 |
| 3 | 12 |
| 8 | 13 |
| 16 | 15 |
| 17 | 16 |
| 18 | 17 |
| 19 | 18 |
| 20 | 19 |
| 23 | 21 |
| 24 | 22 |
| 25 | 23 |
| 26 | 23 |
| 27 | 24 |
| 28 | 26 |
| 29 | 25 |
| 30 | 27 |
| 33 | 29 |
| 34 | 30 |
| 35 | 31 |
| 36 | 31 |
| 37 | 32 |
| 38 | 33 |
| 39 | 34 |
| 40 | 35 |

TABLE 41

MaterialLot OUT SupplyChainStage

| MaterialLotID | SupplyChainStageID |
|---|---|
| 1 | 1 |
| 2 | 2 |
| 3 | 3 |
| 4 | 4 |
| 5 | 5 |
| 6 | 6 |
| 7 | 2 |
| 8 | 7 |
| 9 | 8 |
| 10 | 9 |
| 11 | 9 |
| 12 | 10 |
| 13 | 11 |
| 14 | 12 |
| 15 | 13 |
| 16 | 14 |
| 17 | 15 |
| 18 | 15 |
| 19 | 16 |
| 20 | 17 |
| 21 | 18 |
| 22 | 19 |
| 23 | 20 |
| 24 | 20 |
| 25 | 21 |
| 26 | 22 |
| 27 | 23 |
| 28 | 23 |
| 29 | 24 |
| 30 | 26 |
| 31 | 25 |
| 32 | 27 |
| 33 | 28 |
| 34 | 28 |
| 35 | 29 |
| 36 | 30 |
| 37 | 31 |
| 38 | 31 |
| 39 | 32 |
| 40 | 33 |
| 41 | 34 |
| 42 | 35 |

Rows with a background pattern denotes prototype clone data

TABLE 42

ProcessProtoType Application

| ProcessProtoTypeID | ApplicationID |
|---|---|
| 1 | 1 |
| 2 | 1 |

TABLE 43

SupplyChainStageType Application

| SupplyChainStageTypeID | ApplicationID |
|---|---|
| 1 | 1 |
| 2 | 1 |
| 3 | 1 |
| 4 | 1 |
| 5 | 1 |
| 6 | 1 |
| 7 | 1 |
| 8 | 1 |

TABLE 44

SupplyChainStage LegalEntityRole

| SupplyChainStageID | LegalEntityRoleID |
|---|---|
| 1 | 2 |
| 2 | 2 |
| 3 | 2 |
| 4 | 1 |
| 5 | 1 |
| 6 | 1 |
| 4 | 2 |
| 5 | 2 |
| 6 | 2 |
| 7 | 2 |
| 8 | 1 |
| 9 | 1 |
| 10 | 1 |
| 11 | 1 |
| 8 | 2 |
| 9 | 2 |
| 10 | 2 |
| 11 | 2 |
| 12 | 2 |
| 13 | 2 |
| 14 | 1 |
| 15 | 1 |
| 16 | 1 |
| 17 | 1 |
| 18 | 1 |
| 19 | 1 |
| 14 | 2 |
| 15 | 2 |
| 16 | 2 |
| 17 | 2 |
| 18 | 2 |
| 19 | 2 |
| 20 | 2 |
| 21 | 2 |
| 22 | 2 |
| 23 | 2 |
| 24 | 2 |
| 25 | 2 |
| 26 | 2 |
| 27 | 2 |
| 28 | 2 |
| 29 | 2 |
| 30 | 2 |
| 31 | 2 |

TABLE 44-continued

SupplyChainStage LegalEntityRole

| SupplyChainStageID | LegalEntityRoleID |
|---|---|
| 32 | 2 |
| 33 | 2 |
| 34 | 2 |
| 35 | 2 |

The following scenario demonstrates how the present invention is able to manage changing requirements and process over a period of time. The present invention does this while simultaneously maintaining data integrity, thus allowing the user to obtain information despite the changes that have been made in the data storage structure. The present invention allows all these changes to be made with the solution, which is in continuous use.

Scenario A

A shrimp manufacturer has a lab test process (Oxytetracycline Residue Analysis Report) for the shrimp received in the tanks. This process (process prototype 1) was created and used on Feb. 5, 2003 as shown in a screen shot of a graphical user interface window 500 shown in FIG. 16.

Scenario B

Figure 17:
Figure 18:

After 1 month of operation the shrimp manufacturer was told by its customer that a Chloramphenical residue analysis test was now needed to in addition to the Oxytetracycline residue analysis test. To add the new test the user makes use of the original process in Scenario 1 (process prototype 1) as a clone to create a new process prototype 2. The user modifies process prototype 1 to create the new prototype while the system is still running. This is done by using the existing Oxytetracycline residue analysis test screen as a template to add a new test for the Chloramphenical residue analysis test, see FIGS. 17 and 18.

Scenario C

After three months the shrimp manufacturer was asked again by its customer to add a third test. The new test is a Microbiological analysis test. This was as a direct result of new legislation that had been introduced in the customer's country.

Figure 20:

To do this the user uses the process prototype 2 as clone to create a new process prototype 3, see FIGS. 20-22. The user modifies the process prototype 2 to create a new prototype while the system is still running. This is done by using the existing Oxytetracycline and Chloramphenical residue analysis test as a template screen to create the new Microbiological analysis test Tracing When the shrimp manufacturer, inspector, or other authorized user wants to do a trace of lab information based on the Tank and Raw Material date, the user keys in the required information into a trace criteria window 600 as shown in FIG. 22. After the user selects a GO button, a trace is initiated.

Trace Scenario 1

When a user enters the following search information in the window 600:

Tank Number: TTR-1002

Figure 23:
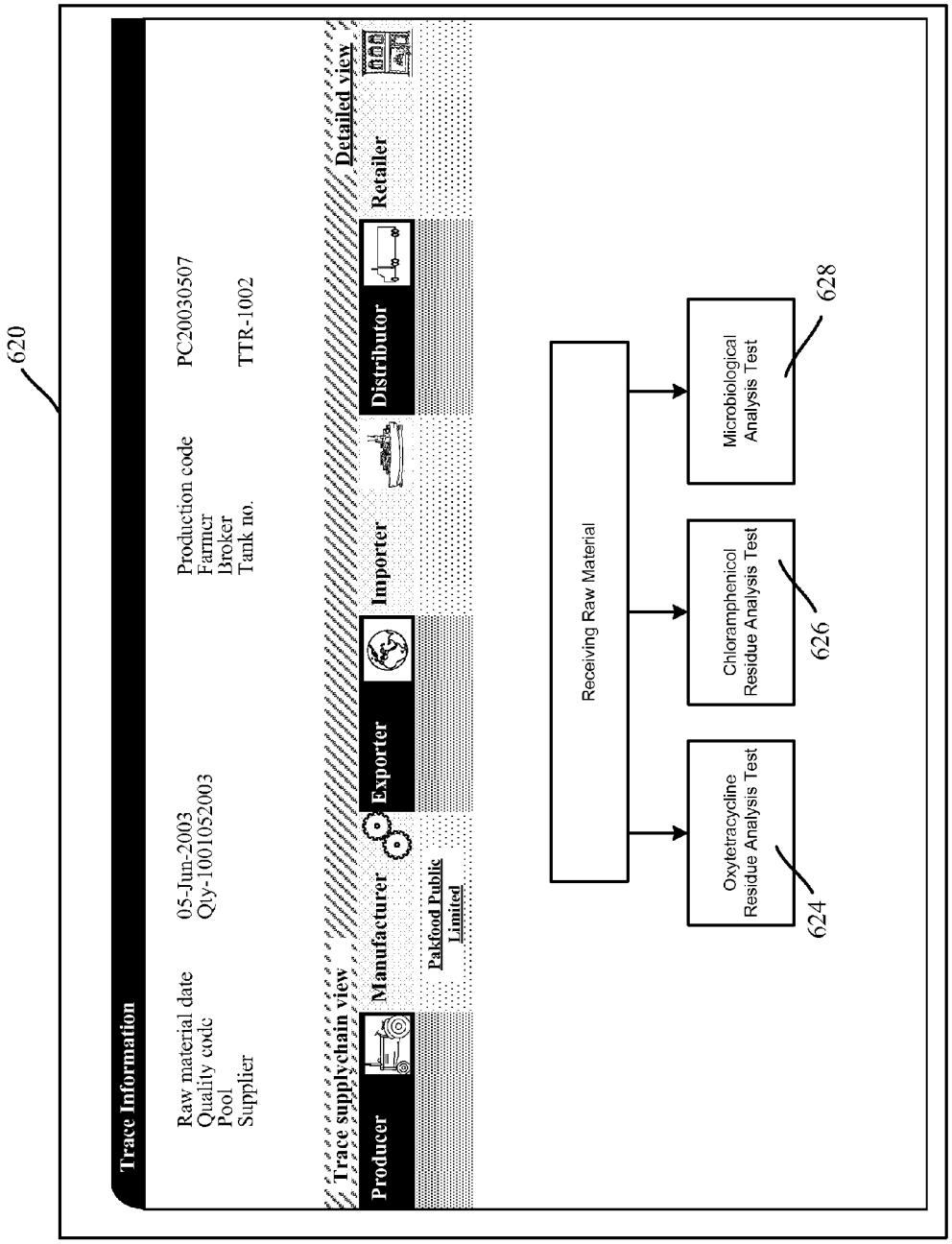

Raw Material Date: Jun. 5, 2003 and initiates a trace, the reports that were created for that tank number on the entered date are made available to the user. FIG. 23 shows as window 620 that is presented to the user once the search is complete. The user is presented with links (boxes 624-628) to the three reports that area available for the entered information. The respective activity reports are obtained by activating the associated link. FIGS. 24-26 are example reports that are displayed upon activation of the corresponding box 624-628.

Scenario 2

When the user enters the following information (as shown in FIG. 27):

Tank Number: TTR-1002

Figure 28:
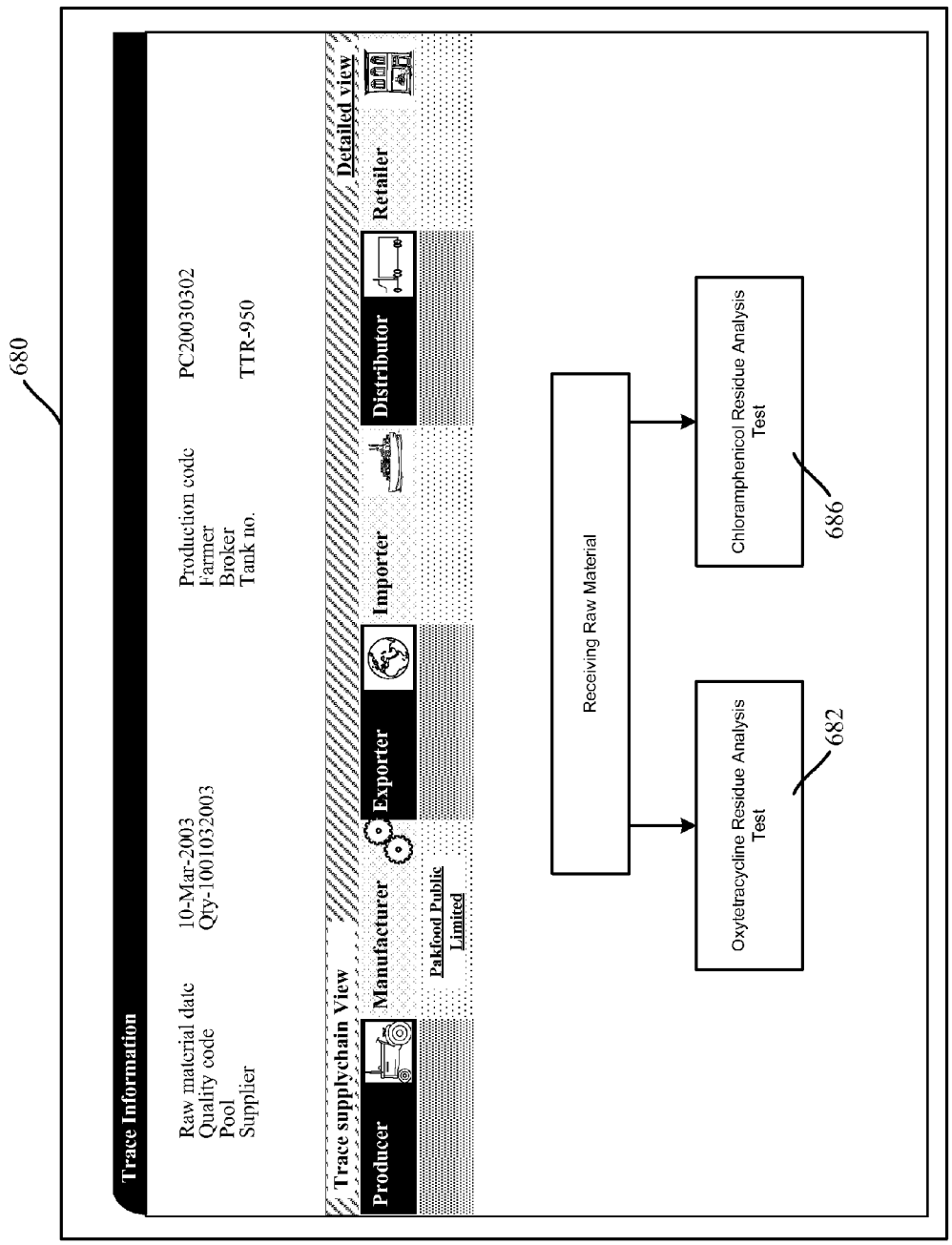

Raw Material Date: Mar. 10, 2003 and initiates a trace, the reports that were created for that tank number on the entered date are made available to the user. FIG. 28 shows as window 680 that is presented to the user once the search is complete. The user is presented with links (boxes 682, 686) to the three reports that area available for the entered information. The respective activity reports are obtained by activating the associated boxes 682, 686. FIGS. 29 and 30 are example reports that are displayed upon activation of the corresponding box 682, 686.

Figure 31:
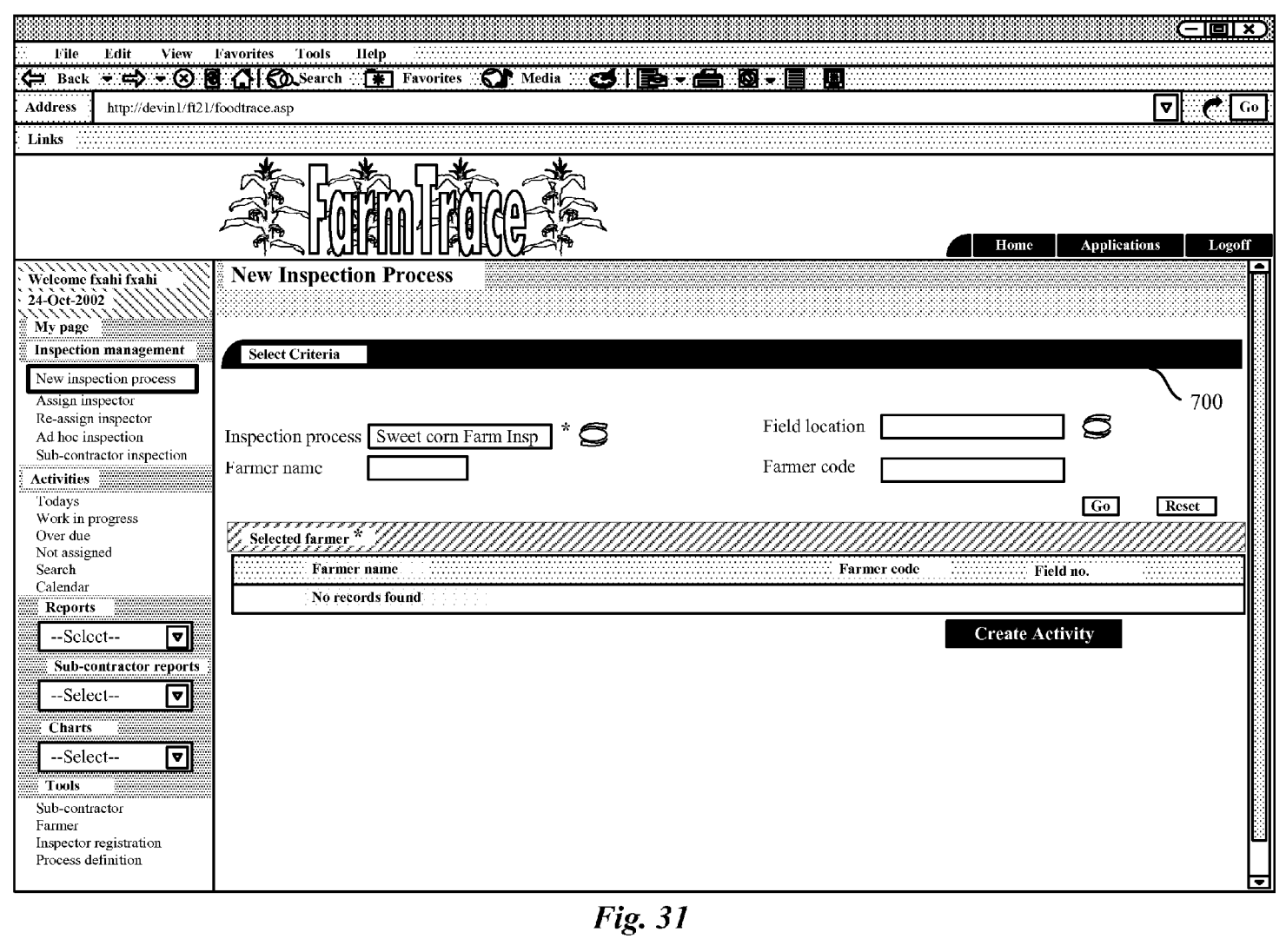

FIGS. 31-35 show customized FarmTrace user interfaces that allow a farmer, inspector, or other user to enter farm related information regarding a harvested product. FIG. 31 is a screen shot of a window 700 that lets a user select a Process Prototype. In the window 700, inspectors or other user creates a set of activities for a farm. This is repeated on a daily basis as necessary. A process prototype clone helps the user to easily create the set of interconnected activities in a single operation.

Figure 32:
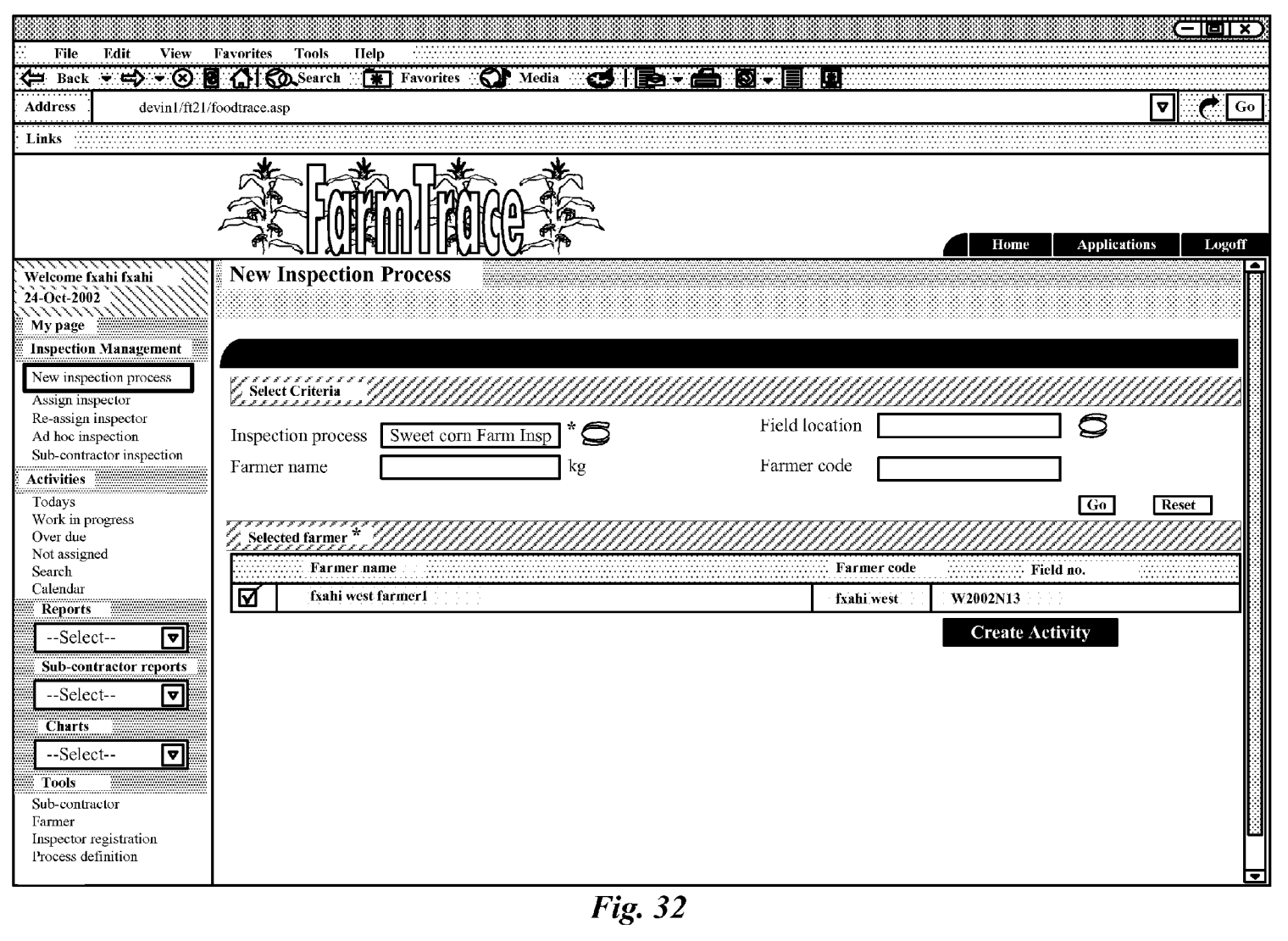

As shown in FIG. 32, farm information has been entered.

Figure 33:
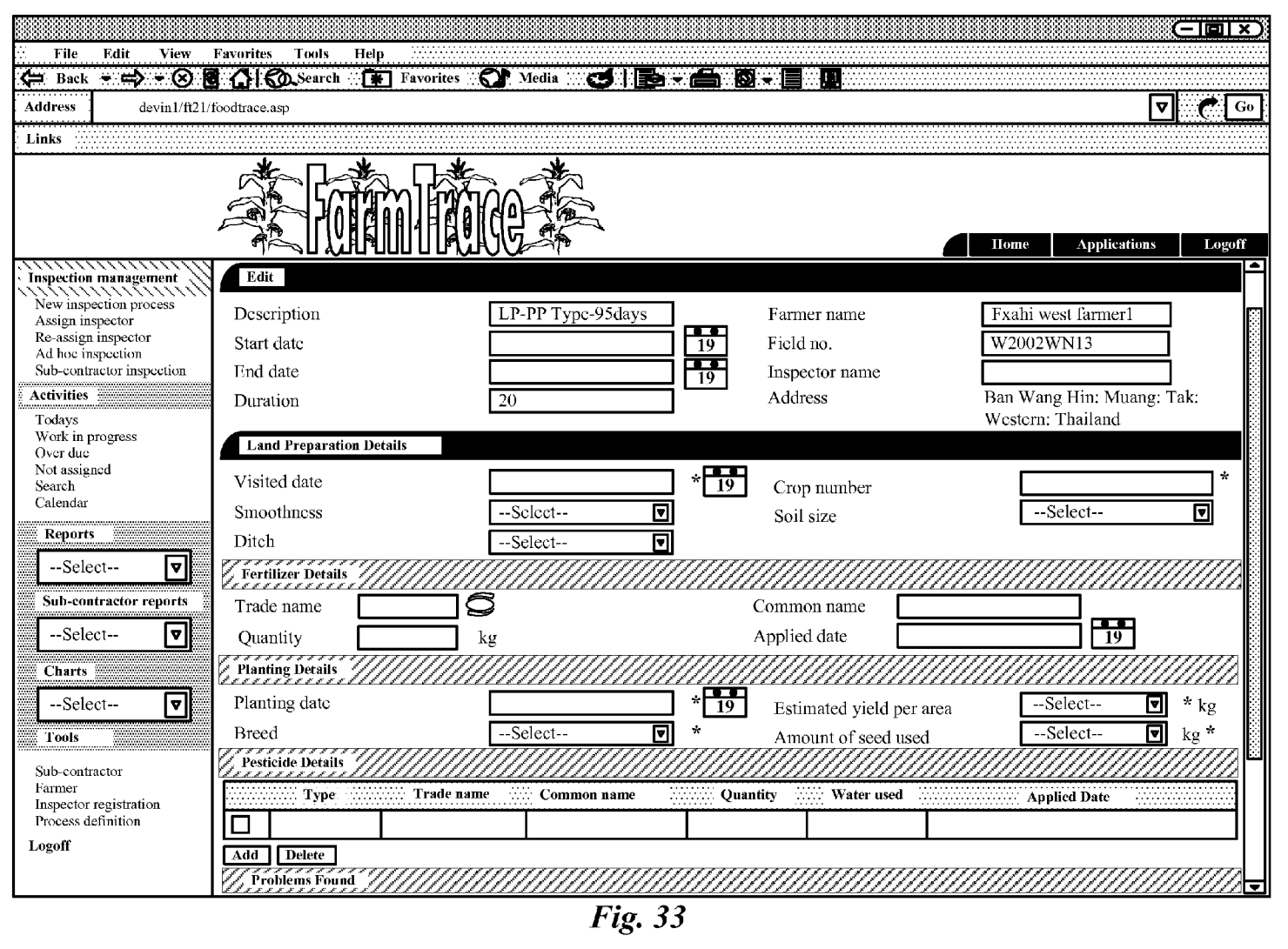

In FIG. 33 Sweet Corn Land Preparation Inspection activities are entered. Land Preparation Inspection activities include other details, such as fertilizer, planting, pesticide details, or any other details desired.

Figure 34:

FIG. 34 shows an entry window for entering Seeding Germination details as wells as other details, such as fertilizer and pesticide details.

Figure 35:
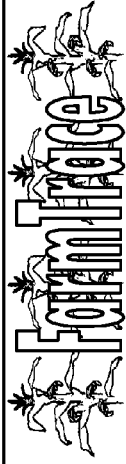

FIG. 35 shows an entry window for entering Growth Development details as wells as other details, such as fertilizer and pesticide details.

Figure 36:
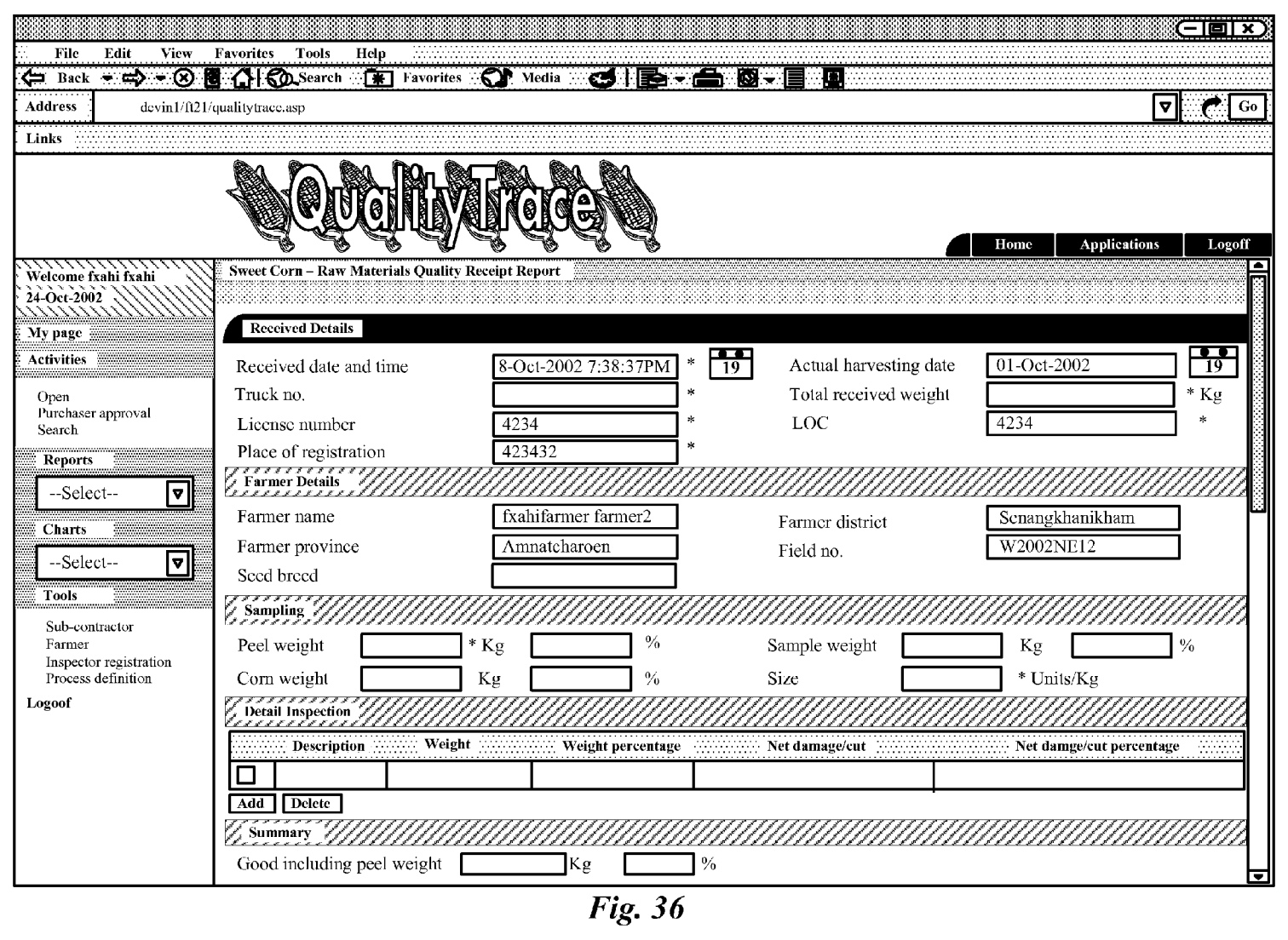

FIG. 36 illustrates a customized user interface for a QualitiyTrace component of the application. FIG. 36 shows an entry window for entering Received details that include other details, such as previously entered farmer details, sampling information, and detail inspection information.

FIGS. 37 and 38 illustrate customized user interfaces for a ProductionTrace component of the application. The ProductionTrace component allows entry of information regarding various user specified production activities.

While the preferred embodiment of the invention has been illustrated and described, as noted above, many changes can be made without departing from the spirit and scope of the invention. Accordingly, the scope of the invention is not limited by the disclosure of the preferred embodiment. By way of example and not limitation, in one alternate embodiment, this invention can be used in conjunction with the invention described in our co-pending application entitled MUTABLE GENERAL LEDGER ACCOUNT STRUCTURE Ser. No. 10/421,375 filed on Apr. 22, 2003, and which is hereby incorporated by reference.

The embodiments of the invention in which an exclusive property or privilege is claimed are defined as follows:

1. A method for representing a food supply chain, the method comprising:
    establishing a distributed editable database retrievable from a computer network; the database configured to define entities participating in a food process, the entities defined using metadata in a table of the database and the food process further having a sequential procedure, a parallel procedure, or a combined sequential and parallel procedure; and
    executing a software executable interface having a presentation services layer configured to provide communications to the distributed editable database via a plurality of servers, a presentation abstraction layer configured to insulate subscribers from the presentation service layers and provide language conversion services, and an application services layer configured to provide at least one executable application program affecting the food process, the software executable interface capable of performing the steps of:
        delineating the connections between the sequential procedure, the parallel procedure, or the combined sequential and parallel procedure utilized in the food process during a run time;
        establishing a distributed editable database retrievable from a computer network;
        accessing content within the distributed editable database through the computer network by a user request; and
        modifying the food supply chain using the at least one executable application program according to changes in a data fields and the metadata of the distributed editable database.

2. The method of claim 1, wherein defining the defining entities participating in the food process includes a supply chain stage type, a material master, and a process prototype.

3. The method of claim 2, wherein the process prototype includes information from the supply chain stage type and the material master.

4. The method of claim 1, wherein defining the food process includes a creation time stamp for each process prototype.

5. The method of claim 4, further comprising:
    searching a supply chain table by entering an analysis date;
    comparing the entered analysis date to the creation time stamp for the stored process prototypes; and
    retrieving traceability information and data from the data fields within the supply chain table based on the comparison.

6. The method of claim 5, wherein retrieving traceability information includes presenting the retrieved traceability information to the entities via a presentation service layer.

7. The method of claim 6, wherein presenting the retrieved traceability information to the entities includes providing data of the creation time stamp for the process prototype is closest to the entered analysis date.

8. The method of claim 5, wherein the supply chain table includes a meta model of the data fields affected by the presentation service layer, the presentation abstraction layer, and the applications service layer for data entry from the servers.

9. A computer program product residing on a non-transitory computer readable memory medium for performing a method for representing a food supply chain, the method comprising:
    compiling a distributed editable database retrievable from a computer network; the database comprising:
        one or more material types; and
        one or more entities relating to the one or more material types participating in a food process, the entities defined using metadata in a table of the database, and the food process defined as having a sequential procedure, a parallel procedure, or a combined sequential and parallel procedure; and
    providing, at run time, a software executable interface having a presentation services layer configured to access the distributed editable database via a plurality of servers, a presentation abstraction layer configured to insulate subscribers from the presentation service layers and provide language conversion services, and an application services layer configured to provide at least one executable application program affecting the food process, the software executable interface further capable of:

delineating the connections between the sequential procedure, the parallel procedure, or the combined sequential and parallel procedure utilized in the food process;

accessing content within the distributed editable database through the computer network by a user request; and modifying the food supply chain by creating a link between a first entity and a second entity of the one or more entities based on the material type.

10. The computer program product of claim 9, wherein defining the manufacturing process includes a supply chain stage type, a material master, and a process prototype.

11. The computer program product of claim 9, wherein the process prototype includes information from the supply chain stage type and the material master.

12. The computer program product of claim 9, wherein defining the manufacturing process includes a creation time stamp for each process prototype.

13. The computer program product of claim 9, wherein the method further comprises:

searching the supply chain table by entering an analysis date;

comparing the entered analysis date to the creation time stamp for the stored process prototypes; and retrieving traceability information and data from the data fields within the supply chain table based on the comparison.

14. The computer program product of claim 13, wherein the method further comprises presenting the retrieved traceability information to the entities.

15. The computer program product of claim 13, wherein retrieving retrieves information and data if based on the comparison, the process prototype has a creation time stamp that is closest to the entered analysis date and is before the entered analysis date.

16. The computer program product of claim 13, wherein the supply chain table includes a meta model of the data fields affected by the presentation service layer, the presentation abstraction layer, and the applications service layer for data entry from the servers.

* * * * *